United States Patent
Harima et al.

(10) Patent No.: US 9,080,639 B2
(45) Date of Patent: Jul. 14, 2015

(54) DRIVING BELT AND METHOD FOR ASSEMBLING THE SAME

(75) Inventors: Kazunori Harima, Susono (JP); Yuji Hattori, Gotenba (JP); Michio Yoshida, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/576,205

(22) PCT Filed: May 27, 2011

(86) PCT No.: PCT/JP2011/062175
§ 371 (c)(1),
(2), (4) Date: Jul. 31, 2012

(87) PCT Pub. No.: WO2012/164639
PCT Pub. Date: Dec. 6, 2012

(65) Prior Publication Data
US 2014/0106919 A1    Apr. 17, 2014

(51) Int. Cl.
*F16G 1/21* (2006.01)
*F16G 1/22* (2006.01)
*F16G 5/16* (2006.01)

(52) U.S. Cl.
CPC ............ *F16G 5/16* (2013.01); *Y10T 29/49895* (2015.01)

(58) Field of Classification Search
CPC ............ F16G 5/16; F16G 5/18; F16G 5/166; F16G 5/163; F16H 9/24
USPC ........................................................ 474/242
See application file for complete search history.

(56) References Cited

U.S. PATENT DOCUMENTS

| | | | | | |
|---|---|---|---|---|---|
| 4,457,742 | A | * | 7/1984 | Hattori et al. | 474/201 |
| 4,552,548 | A | * | 11/1985 | Hattori | 474/201 |
| 4,552,549 | A | * | 11/1985 | Hattori | 474/202 |
| 4,560,371 | A | * | 12/1985 | Hattori | 474/201 |
| 4,595,387 | A | * | 6/1986 | Frazier et al. | 474/201 |
| 4,758,211 | A | * | 7/1988 | Hattori | 474/242 |
| 4,790,798 | A | * | 12/1988 | Hattori | 474/242 |
| 4,854,926 | A | * | 8/1989 | Hattori | 474/242 |
| 4,900,296 | A | * | 2/1990 | Schmidt | 474/242 |
| 5,123,880 | A | * | 6/1992 | Sekine et al. | 474/244 |
| 5,342,251 | A | * | 8/1994 | Kanehara et al. | 474/242 |
| 6,074,317 | A | * | 6/2000 | Kobayashi | 474/201 |
| 6,332,854 | B1 | * | 12/2001 | Kanokogi et al. | 474/242 |
| 6,565,469 | B1 | * | 5/2003 | Aoyama et al. | 474/242 |
| 6,679,798 | B1 | * | 1/2004 | Takagi et al. | 474/242 |

(Continued)

FOREIGN PATENT DOCUMENTS

| | | |
|---|---|---|
| JP | 59-13741 | 1/1984 |
| JP | 62-12033 | 1/1987 |

(Continued)

*Primary Examiner* — Henry Liu
(74) *Attorney, Agent, or Firm* — Finnegan, Henderson, Farabow, Garrett & Dunner, LLP

(57) ABSTRACT

A driving belt comprising plate elements juxtaposed in its thickness direction and a flat ring fastening the elements annularly. The elements includes at least one adjuster element configured to adjust an endplay as a total of clearances between the adjacent elements in the elements fastened annularly by the ring. The adjuster element comprises an insertion groove opening toward the endplay, and an inserting member inserted into the insertion groove and configured to protrude partially from the insertion groove thereby adjusting the endplay.

13 Claims, 20 Drawing Sheets

(56) References Cited

U.S. PATENT DOCUMENTS

| | | | |
|---|---|---|---|
| 6,758,778 B2 * | 7/2004 | Serkh | 474/242 |
| 6,896,633 B2 * | 5/2005 | Kanehara | 474/242 |
| 7,131,923 B2 * | 11/2006 | Sattler | 474/242 |
| 7,169,071 B2 * | 1/2007 | Miura et al. | 474/242 |
| 7,846,049 B2 * | 12/2010 | Kanehara et al. | 474/201 |
| 8,100,797 B2 * | 1/2012 | Prinsen | 474/242 |
| 8,672,787 B2 * | 3/2014 | Faes et al. | 474/240 |
| 2002/0025871 A1 * | 2/2002 | Fujioka | 474/242 |
| 2002/0115513 A1 * | 8/2002 | Yuan | 474/201 |
| 2002/0160872 A1 * | 10/2002 | Kanokogi et al. | 474/242 |
| 2004/0152550 A1 * | 8/2004 | Van Der Meer et al. | 474/242 |
| 2005/0176541 A1 * | 8/2005 | Sattler | 474/242 |
| 2006/0079366 A1 * | 4/2006 | Kanehara et al. | 474/242 |
| 2007/0072721 A1 * | 3/2007 | Takagi et al. | 474/242 |
| 2007/0161447 A1 * | 7/2007 | Shin et al. | 474/242 |

FOREIGN PATENT DOCUMENTS

| | | |
|---|---|---|
| JP | 2002-48194 | 2/2002 |
| JP | 2004-293634 | 10/2004 |
| JP | 2006-266363 | 10/2006 |
| JP | 2010-174933 | 8/2010 |
| JP | 2010-265960 | 11/2010 |

* cited by examiner

DRIVING BELT AND METHOD FOR ASSEMBLING THE SAME

CROSS-REFERENCE TO RELATED APPLICATIONS

This application is a national phase application of International Application No. PCT/JP2011/062175, filed May 27, 2011, the content of which is incorporated herein by reference.

TECHNICAL FIELD

This invention relates to a driving belt formed by fastening a plurality of plate-like elements juxtaposed in a same orientation annularly by a flat ring, and to an assembling method thereof.

BACKGROUND ART

A push type driving belt to be used in a belt type continuously variable transmission is known in the prior art. The driving belt of this kind is formed by annularly juxtaposing a plurality of plate members called an "element" or a "block" in a same orientation, and by fastening the juxtaposing plate members by an annular member such as a band, a hoop and a ring.

One example of the above-explained driving belt is disclosed in Japanese Patent Laid-Open No. 2006-266363. According to the "transmission belt" taught by Japanese Patent Laid-Open No. 2006-266363, an element comprises a first hole and a first projection formed at a head part, and a second hole and a second projection formed in an inner circumferential side of a rocking edge. A plurality of the elements thus formed are fastened by a ring in a circular manner to form the transmission belt. According to the transmission belt taught by Japanese Patent Laid-Open No. 2006-266363, therefore, the first projection is inserted into the first hole but the second hole and projection are disengaged from each other in a straight region of the transmission belt between pulleys. Meanwhile, in a curved region of the transmission belt around the pulley, the first hole and the first projection are disengaged from each other but the second projection is inserted into the second hole.

Thus, the conventional driving belt is assembled by fastening the array of the element having the projection using the ring. However, in case of inserting a last piece of the element into the array of the elements, a sufficient clearance wider than the projection is required in the element array in order to avoid interference of the projection of the element to be inserted into the element array with the adjacent element already fastened by the ring. Therefore, as shown in FIG. 23, an endplay as a total of clearances among the elements remains inevitably in the element array of the assembled belt. However, in case the end play is too small, the last piece of the element is difficult to be inserted into the element array and easiness or productivity of the driving belt is thereby degraded. To the contrary, in case the end play is large, the last piece of the element is easy to be inserted into the element array. In this case, however, a transmission loss is increased due to a slippage between the elements and the ring, and a power transmitting efficiency is thereby degraded.

The last piece of the element can be inserted into the element array easily by shortening the projection even if the endplay is narrow. However, a fundamental role of the projection and the hole is to align the elements being juxtaposed. Therefore, if the length of the projection is too short, the element array cannot be aligned. In addition, durability and transmission efficiency of the driving belt may be degraded.

In order to solve the problems concerning the end play of the driving belt, Japanese Patent Laid-Open No. 2004-293634 discloses a "metal belt" using a plurality of spring means for contacting the elements in an element array by widening a clearance between the elements to which the spring means is inserted. According to the teachings of Japanese Patent Laid-Open No. 2004-293634, therefore, the elements can be kept in contact with each other in a region from an output pulley to an input pulley in a direction of movement. In addition, the elements can also be contacted to each other in a region toward a compression side where the belt is contacted with an input pulley to be rotated therewith. For this reason, clearances among the elements in the region to be contacted with the input pulley of the compression side are eliminated so that an occurrence of slippage of the element can be prevented in this region.

However, according to the teachings of Japanese Patent Laid-Open No. 2004-293634, the above-explained plurality of "spring means" are arranged in the metal belt. That is, in addition to the basic elements, a plurality of elements serving as "spring means" have to be assembled to form the metal belt. Therefore, an assembly cost and number of assembling steps of the metal belt have to be increased in comparison with those of the other conventional driving belts. In addition, when the metal belt is subjected to a load, the "spring means" in the compression side is compressed, and the "spring means" in a decompression side is decompressed to be elongated a direction to push the elements of both sides. Therefore, when those "spring means" are thus deformed, the "spring means" and elements slip inevitably on the ring. Thus, the transmission loss resulting from the slippage may not be reduced sufficiently even if the "spring means" are used in the driving belt.

Therefore, the conventional driving belt thus formed by fastening a plurality of elements annularly by a ring has to be improved to facilitate the assembling work thereof by ensuring the endplay appropriately, while reducing the endplay to improve the power transmitting efficiency thereof.

DISCLOSURE OF THE INVENTION

The present invention has been conceived noting the technical problems thus far described, and its object is to provide a driving belt having an excellent power transmitting efficiency, which can be assembled easily, and in which an endplay thereof can be adjusted when assembling the driving belt by fastening element using rings. Another object of the present invention is to provide an assembling method of the above-explained driving belt.

In order to achieve the above-mentioned object, according to the present invention, there is provided a driving belt comprising a plurality of plate elements juxtaposed in its thickness direction, and a flat ring which fastens the elements in a circular manner. According to the present invention, the plurality of elements includes at least one adjuster element, which is configured to adjust an endplay as a total of clearances between the adjacent elements in the elements fastened by the ring in a circular manner. Specifically, the adjuster element comprises an insertion groove opening toward the endplay, and an inserting member which is inserted into the insertion groove and configured to protrude partially from the insertion groove thereby adjusting the endplay.

According to the present invention, the insertion groove of the adjuster element is formed on a face of a same side as a face of the other element on which a rocking edge is formed, at a level in the vicinity of a level at which the rocking edge is situated. Meanwhile, the inserting member comprises an edge portion, which is formed on a face to be opposed to the adjacent other element in case the inserting member is inserted into the insertion groove, and which is configured to serve as the rocking edge in case the inserting member is inserted into the insertion groove.

Alternatively, the rocking edge may also be formed on the adjuster element as that of the other elements. In this case, the insertion groove of the adjuster element is formed on a face opposite to a face of the other element on which a rocking edge is formed, at a level in the vicinity of a level at which the rocking edge is situated. Meanwhile, a flat face is formed on the inserting member. Specifically, the flat face is formed to be opposed to the adjoining other element in case the inserting member is inserted into the insertion groove, and to be in parallel with a face of the adjoining other element on which the rocking edge is not formed.

Specifically, the insertion groove includes a first insertion groove formed at the level in the vicinity of the level at which the rocking edge of the other element is situated, and a second insertion groove formed on a head portion of the adjuster element situated in an outer circumferential side of the elements fastened in a circular manner. Meanwhile, the inserting member includes a first inserting member to be inserted into the first insertion groove, and a second inserting member to be inserted into the second insertion groove.

In addition, according to the present invention, at least one of the inserting member and the insertion groove comprises a disengagement preventing means, which is configured to engage the inserting member with the insertion groove in case the inserting member is inserted into the insertion groove thereby preventing a disengagement of the insertion member from the insertion groove.

According to another aspect of the present invention, there is provided an assembling method of a driving belt comprising an aligning step of juxtaposing a plurality of plate elements in its thickness direction, and an assembling step of fastening an array of the elements juxtaposed at the aligning step in a circular manner. Specifically, at the aligning step, at least one adjuster element is aligned in an array of the elements before inserting the inserting member into the insertion groove. The assembling method further comprises an endplay adjusting step of reducing an endplay after the assembling step, by inserting the inserting member into the insertion groove.

According to the present invention, therefore, the driving belt can be assembled easily while adjusting the endplay thereof when fastening the elements in a circular manner by the ring. Specifically, the driving belt is assembled by forming an element array by juxtaposing the elements using at least one adjuster element before the inserting member into the insertion groove. Therefore, all of the elements including the adjuster element can be fastened easily by the ring before reducing the endplay in the aligning direction of the element array. After thus fastening all of the elements including the adjuster element, the endplay is reduced by inserting the inserting member into the insertion groove. For this purpose, dimensions of the inserting member are determined taking into consideration a distance of the endplay so that the endplay can be reduced to substantially zero. As a result of thus reducing the endplay, a transmission loss resulting from a slippage between the element and the ring can be reduced so that the power transmitting efficiency of the driving belt is improved. Thus, according to the present invention, the driving belt can be assembled easily without degrading the power transmitting efficiency.

As described, the edge portion is formed on the inserting member. Therefore, in case of reducing the endplay by inserting the inserting member into the insertion groove of the adjuster element, the edge portion of the inserting member is contacted with a flat face of the adjoining element to serve as the rocking edge. Thus, the adjuster element serves as the other elements having the rocking edge.

Alternatively, a flat face may also be formed on the inserting member. In this case, the flat face formed on the inserting member is contacted with the rocking edge of the adjoining element under the situation in which the inserting member is inserted into the insertion groove of the adjuster element to reduce the endplay. That is, the flat face serves as a receiving face of a reaction force from the rocking edge. Therefore, the adjuster element serves as the other elements. Further, the flat face may be formed easily on the inserting member in comparison with forming a curved face or an edge thereon. For this reason, according to the present invention, the driving belt can be manufactured easily.

As also described, according to the driving belt of the present invention, the second insertion groove may be formed on the head portion of the adjuster element situated in the outer circumferential side, in addition to the first insertion groove formed at the level in the vicinity of the level at which the rocking edge of the other element is situated. In this case, the first inserting member is inserted into the first insertion groove, and the second inserting member is inserted into the insertion groove. That is, the adjuster element is contacted with the adjoining element at two different levels. Therefore, the attitude of the adjuster element in the element array can be stabilized. In other words, the adjuster element can be contacted with the adjoining element in a same condition as the other elements. Thus, the adjuster element serves as the other elements also in this case.

In addition, according to the present invention, the adjuster element further comprises the disengagement preventing means configured to engage the inserting member inserted into the insertion groove with the insertion groove in case the inserting member is inserted into the insertion groove to reduce the endplay. Therefore, the inserting member can be prevented from being disengaged from the adjuster element even after fastening the elements by the ring.

Meanwhile, according to the assembling method of the present invention, the driving belt is assembled using the adjuster element thus structured together with the other standard elements. Therefore, the driving belt can be assembled easily, that is the productivity of the driving belt can be improved, while improving a power transmitting efficiency.

BEST MODE FOR CARRYING OUT THE INVENTION (Structure of the Driving Belt)

Figure 1:
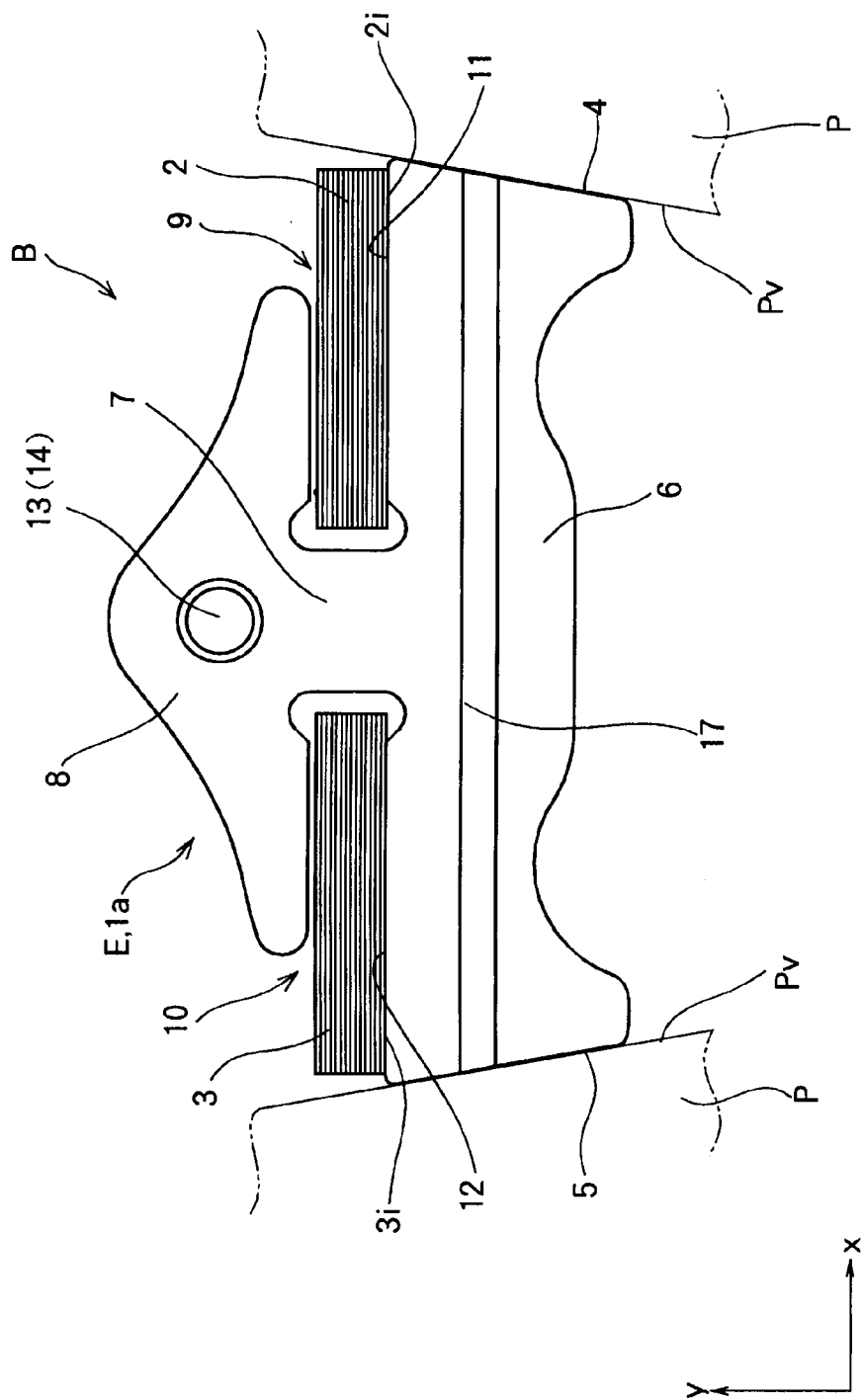
FIG. 1 is a front view schematically showing a structure of a standard element and a cross-section of a ring forming the driving belt of the present invention.

Next, examples of a structure of the driving belt according to the present invention will be explained hereinafter with reference to the accompanying drawings. For example, a driving belt to which the present invention is applied is used in a belt-type continuously variable transmission for a vehicle. Specifically, the driving belt is applied to a V-groove of a pulley formed between a pair of sheaves to transmit a torque by a friction force established between the belt and the pulley. A fundamental structure of the driving belt is schematically shown in FIGS. 1 to 4. As shown in FIGS. 1 and 3, a driving belt B is applied to a pair of (driving and driven) pulleys P forming a transmission mechanism of the belt-type continuously variable transmission. Each pulley P is formed by a pair of fixed sheave and movable sheave being opposed to each other, and opposed faces of those sheaves are individually tapered to form a belt groove Pv between those sheaves. A width of the groove Pv is varied by reciprocating the movable sheave using an actuator such as hydraulic cylinder.

The driving belt B is formed by fastening a plurality of elements E in a circular manner by rings 2 and 3. Specifically, the element E is configured to withstand lateral pressure from the sheaves of the pulley P when the driving belt B enters into the belt groove Pv and the element E is thereby contacted with the tapered faces of the belt groove Pv. According to the present invention, the element E includes a canonically shaped standard element 1a, and an adjuster element 1b configured to adjust an endplay in an aligning direction of the element array fastened annularly by the rings 2 and 3.

Figure 2:
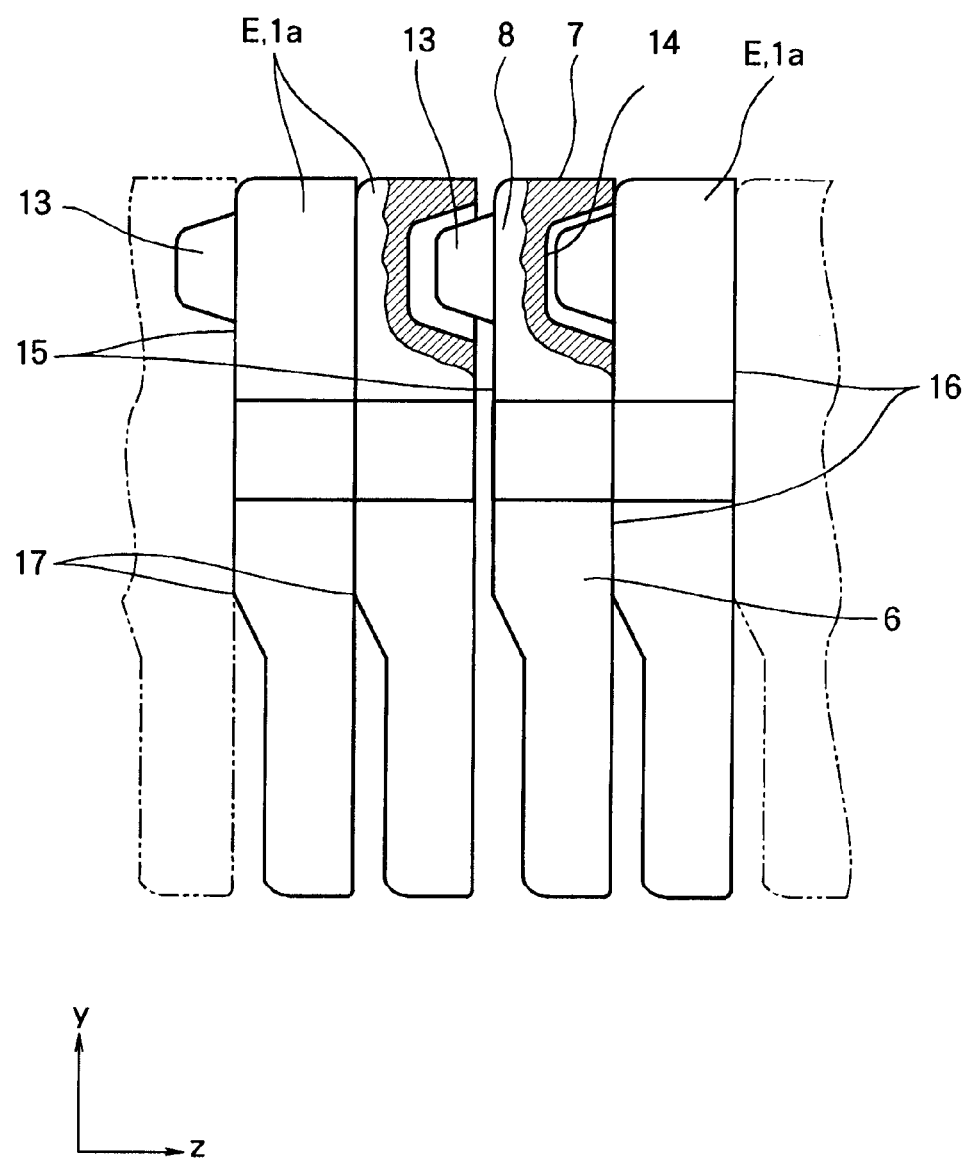
FIG. 2 is a side view (or partial sectional view) schematically showing a structure of the standard elements forming the driving belt of the present invention.
Figure 3:
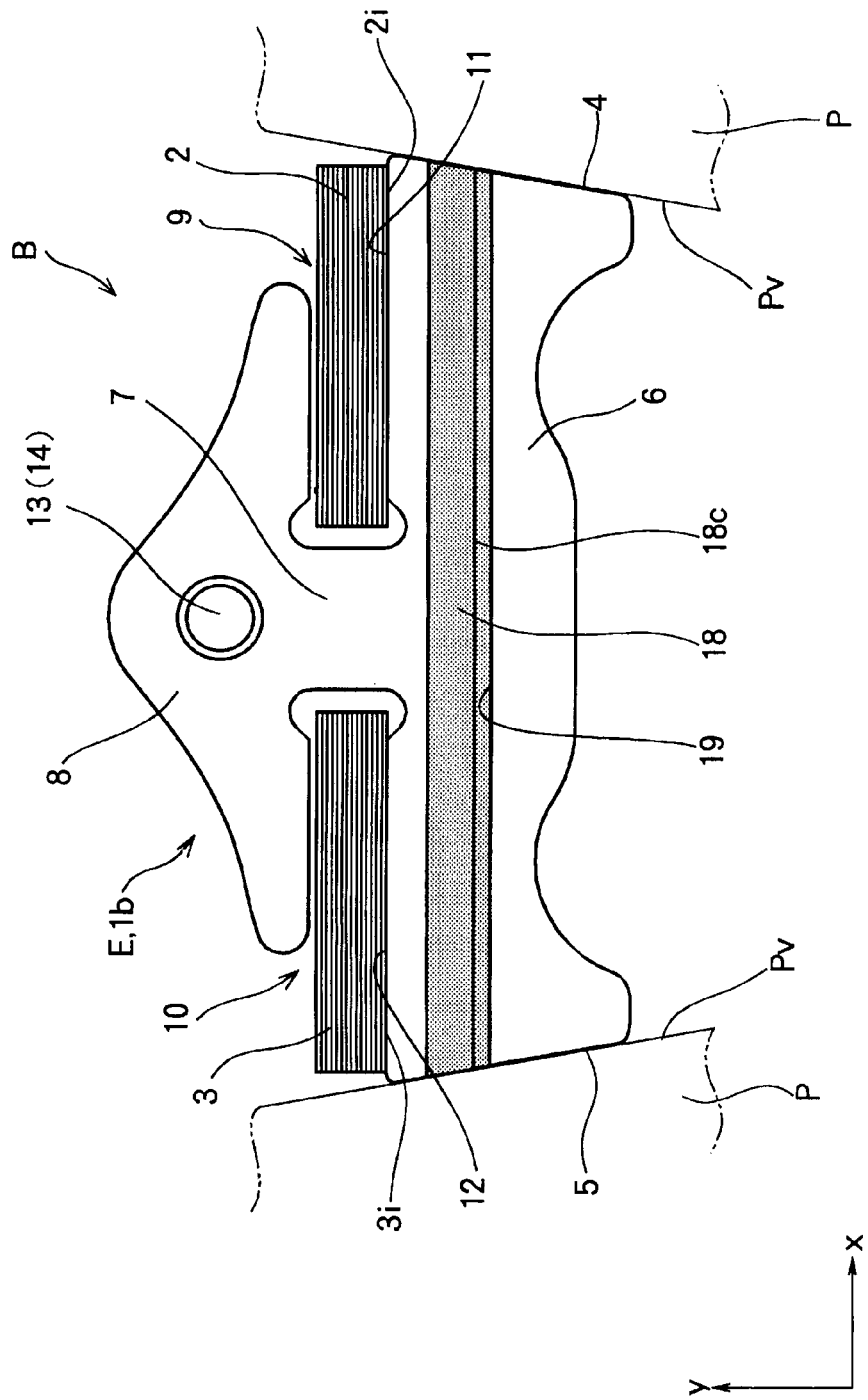
FIG. 3 is a front view schematically showing a structure of an adjuster element and a cross-section of the ring forming the driving belt of the present invention.
Figure 23:
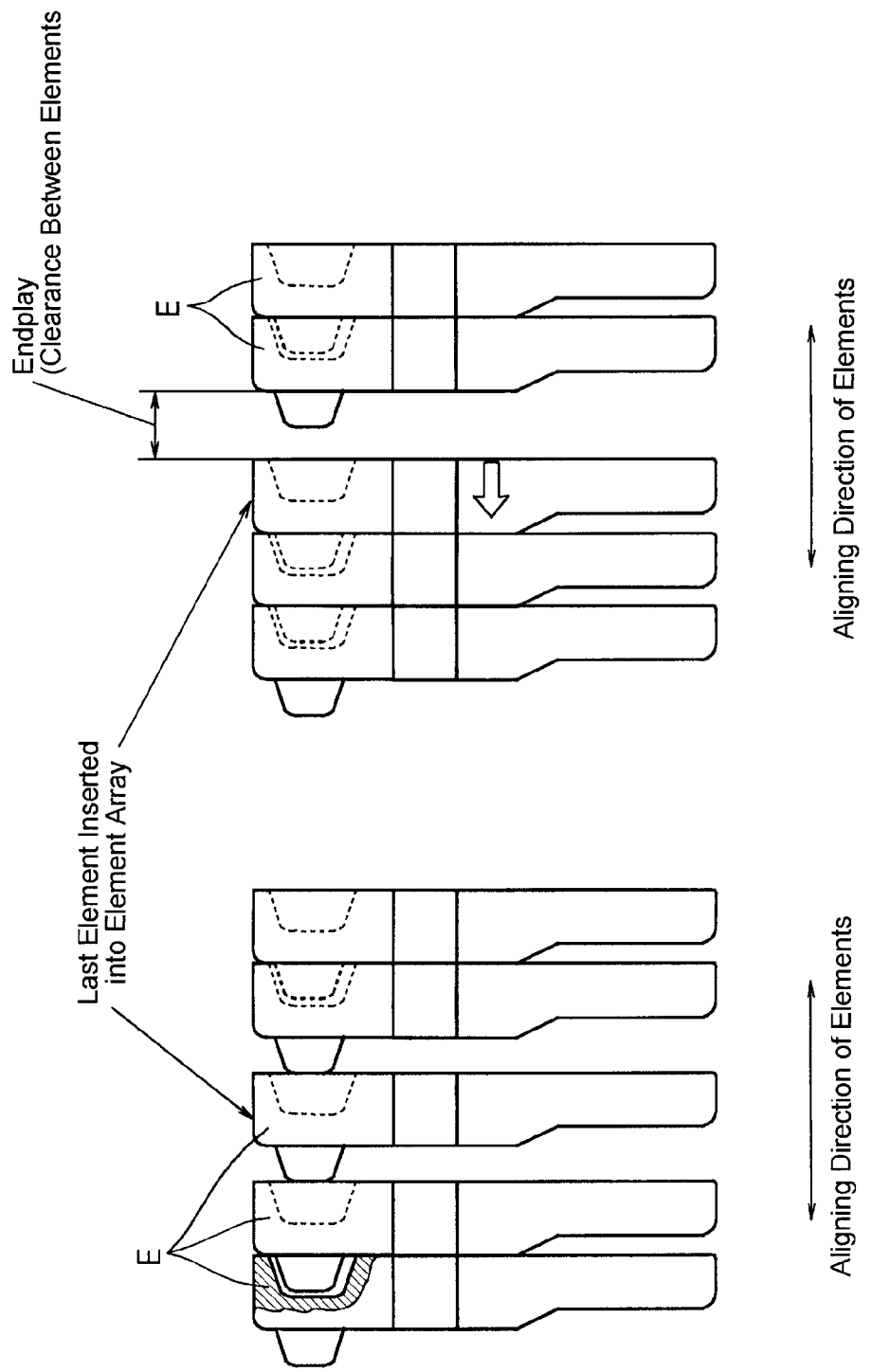
FIG. 23 is a view schematically showing a basic element used in a conventional driving belt and an endplay in the aligning direction.

The standard element 1a is, as shown in FIGS. 1, 2 and 23, a conventional element to be used mainly in the elements E forming the driving belt B. On the other hand, only one or a few pieces of the adjuster element 1b is/are used in the elements E for the purpose of adjusting the end play. A fundamental structure of the adjuster element 1b is similar to that of the basic element 1a. Specifically, the standard element 1a and adjuster element 1b are plate member made of metal. Both lateral faces of a base portion 6, that is, both end faces 4 and 5 (in the direction of x-axis in FIGS. 1 and 3) of the base portion 6 are inclined to conform to an inclination of the belt groove Pv of the pulley P. Therefore, each end face 4 and 5 of the base portion 6 serves as a so-called flank face to be contacted frictionally with the belt grooves Pv thereby transmitting the torque between the pulley P and the driving belt B.

A neck portion 7 extends upwardly in FIGS. 1 to 4 from a width center of the base portion 6, and a head portion 8 is formed integrally with an upper end portion of the neck portion 7 in a manner to extend toward both lateral ends of the base portion 6 (i.e., in the direction of x-axis in FIGS. 1 and 3) like a canopy. Consequently, slits 9 and 10 opening laterally are formed on both sides of the neck portion 7 between an upper edge of the base portion 6 and a lower edge of the head portion 8 (in FIGS. 1 to 4). Rings 2 and 3 are individually fitted into the slits 9 and 10 thereby fastening an array consisting of the standard element 1a and the adjuster element(s) 1b juxtaposed closely in a circular manner. That is, the upper edges of the base portion 6 individually serve as saddle faces 11 and 12 to which inner circumferential faces 2i and 3i of the rings 2 and 3 are contacted under the situation in which the standard element 1a and the adjuster element(s) 1b are fastened by the rings 2 and 3 in a circular manner.

Both of the rings 2 and 3 are layered rings formed by stacking a plurality of thin flat metal rings such as steel bands in the radial (or thickness) direction. The rings 2 and 3 are kept in the stack by a tension of each of the band and friction acting between the bands.

In order to align the adjacent elements juxtaposed in the array of the standard element 1a and adjuster element 1b in its thickness direction (i.e., in a z-axis direction of FIGS. 2 and 4), a protrusion 13 and a hole 14 are formed on the head portion 8 of each of the standard element 1a and adjuster element 1b. Specifically, the projection 13 is formed on one of front and rear faces in the thickness direction of the head portion 8 (e.g., on a front face 15 of the left side of FIGS. 2 and 4) above the neck portion 7 (i.e., at a width center of the head portion 8). Meanwhile, the hole 14 to which the projection 13 of adjoining element is inserted loosely is formed on the opposite face of the head portion 8 (e.g., a rear face 16 of the right side of FIGS. 2 and 4). Therefore, a relative position between the adjoining elements can be determined in both vertical and horizontal directions by inserting the projection 13 into the hole 14 of the adjoining elements.

As described, the standard element 1*a* and adjuster element(s) 1*b* are juxtaposed in a same orientation and fastened by the rings 2 and 3 in a circular manner. In case the driving belt B thus formed is applied to the pulleys P, some of the elements 1*a* and 1*b* around the pulleys P are spread like a fan while being contacted tightly with each other. For this purpose, as illustrated in FIGS. 1 to 4, a thickness of the element 1 is thinned at its lower portion (that is, at the portion close to the rotational center of the pulley P).

Specifically, a portion of the front face 15 of the base portion 6 below the saddle faces 11 and 12 (i.e., a lower portion in FIGS. 1 to 4) is depressed to be thinner than the maximum thickness of the base portion 6. In other words, a thickness of the base portion 6 is reduced between a portion of the front face 15 lower than a predetermined distance from the saddle faces 11 and 12 and the lowest portion of the element 1*a* or 1*b* in a height direction (i.e., in the direction of y-axis in FIGS. 1 to 4). Here, the lowest portion of the standard element 1*a* or the adjuster element 1*b* is a portion to be closest to a rotational center of the pulley P when the element is situated around the pulley P. Therefore, in case the elements 1*a* and 1*b* in the element array are spread like a fan, the element 1*a* or 1*b* is contacted with the adjoining element at a boundary portion where the thickness thereof is thus changed. That is, an edge line or a ridge line as a boundary at which the thickness of the base portion 6 is thus changed functions as a rocking edge 17, which is to be contacted with a rear face 16 of the adjoining element 1*a* or 1*b* in the region where the elements array is bent into arcuate around the pulley P.

Figure 4:
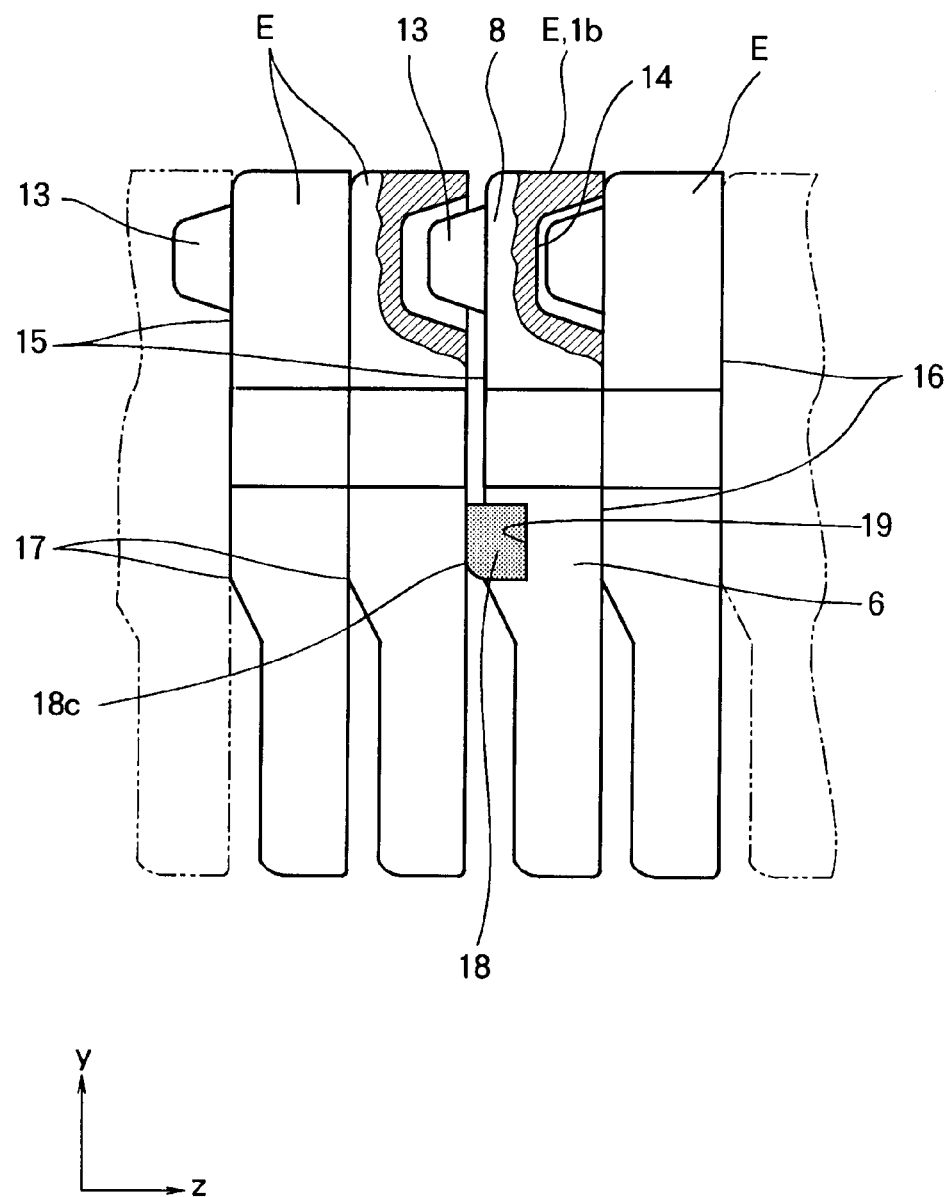
FIG. 4 is a side view (or partial sectional view) schematically showing a structure of the adjuster element used in the driving belt of the present invention.
Figure 5:
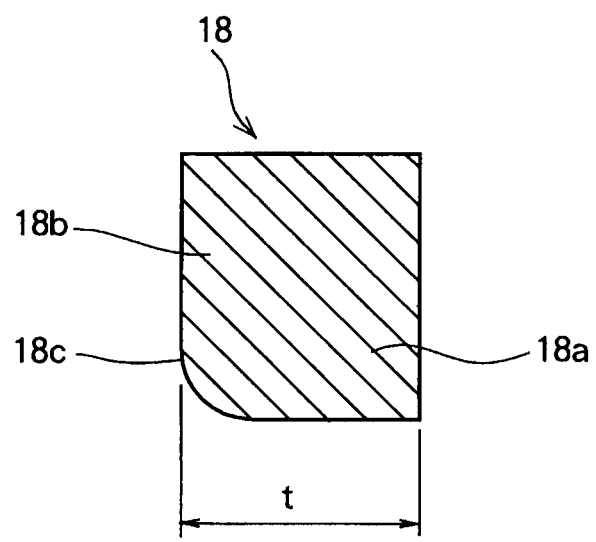
FIG. 5 is a sectional view showing a structure of an inserting member of the adjuster element shown in FIGS. 3 and 4.

As shown in FIGS. 3 and 4, according to the present invention, the adjuster element 1*b* comprises an inserting member 18 for adjusting the endplay of the driving belt B, and an insertion groove 19 to which the inserting member 18 is inserted to be engaged therewith. According to the example shown in FIGS. 3 and 4, the inserting member 18 is a rod member whose cross-section is substantially rectangular. For example, the inserting member 18 is made of a metal material used for the standard element 1*a* and the adjuster element 1*b*. Alternatively, the inserting member 18 may also be made of other materials having strength or hardness similar to that of the standard element 1*a* and the adjuster element 1*b*. As shown in FIG. 5, the inserting member 18 comprises an engaging portion 18*a* which is inserted into the insertion groove 19 to be engaged with the adjuster element 1*b*, and a contact face 18*b* which is contacted with the rear face 16 of the element being opposed to the adjuster element 1*b* holding the inserting member 19 across the endplay. In addition, an edge portion 18*c* is formed on the contact face 18*b*. Therefore, the edge portion 18*c* serves as a rocking edge as the aforementioned rocking edge 17 under the situation in which the inserting member 18 is inserted into the insertion groove 19 to fill in the endplay.

Figure 6:
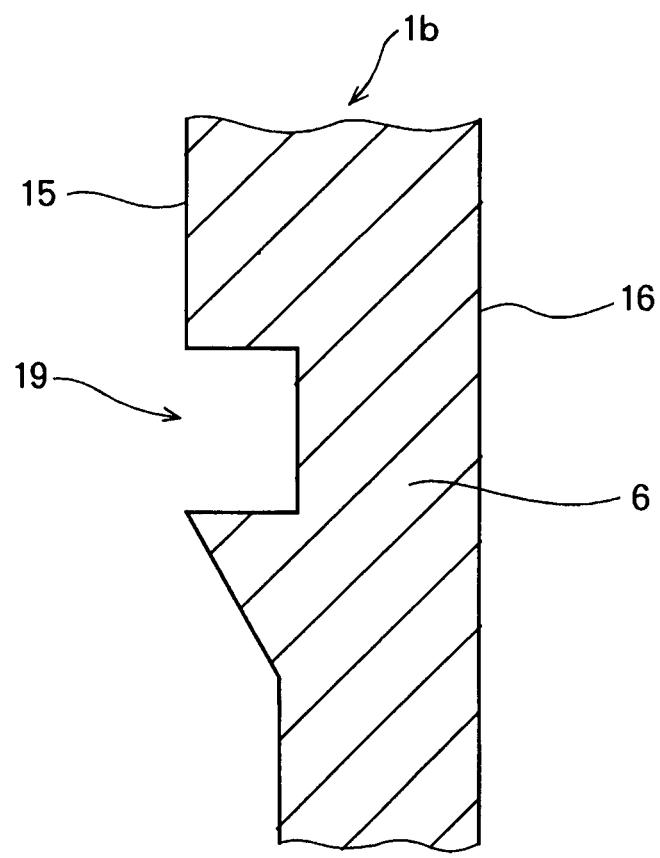
FIG. 6 is a sectional view showing a structure of an insertion groove of the adjuster element shown in FIGS. 3 and 4.
Figure 7:
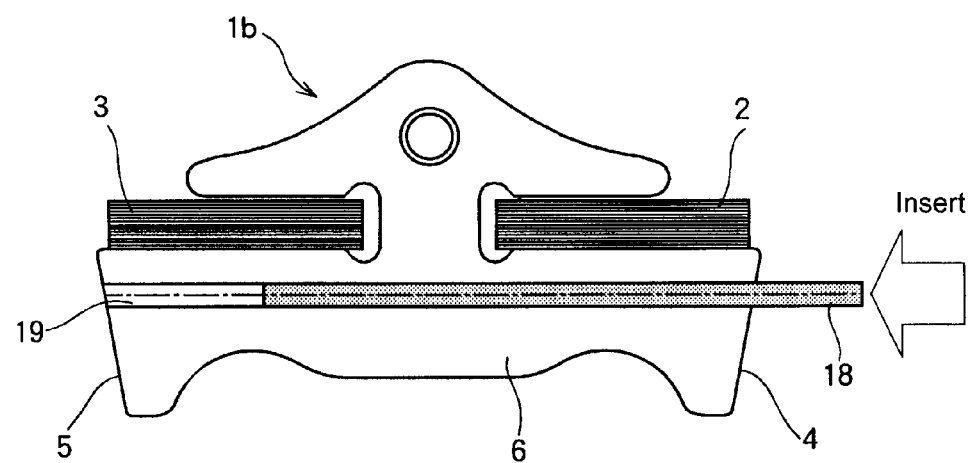
FIG. 7 is a sectional view showing a situation in which the inserting member is inserted into the insertion groove formed on the adjuster element shown in FIGS. 3 and 4.

According to the example shown in FIGS. 3 and 4, the insertion groove 19 is formed on the base portion 6 in a manner to open to the endplay between the adjuster element 1*b* and the adjacent element in the array of the elements E fastened in a circular manner, and the inserting member 18 whose cross-section is rectangular is inserted therein. Specifically, as shown in FIG. 6, the insertion groove 19 opens toward the front face 15 and a cross-section thereof is also rectangular to hold the engaging portion 18*a* of the inserting member 18 therein. As shown in FIG. 7, in order to allow the inserting member 18 to be inserted into the insertion groove 19 laterally from the end face 4 (or 5) of the adjuster element 1*b*, the insertion groove 19 is also open to both lateral ends.

More specifically, according to the examples shown in FIGS. 3 and 4, the insertion groove 19 of the adjuster element 1*b* is formed on a face of the same side as the face of the standard element 1*a* on which the rocking edge 17 is formed, in the aligning direction of the element array. In addition, the insertion groove 19 is formed at a level in the vicinity of the level of the rocking edge 17 formed on the standard element 1*a*. In other words, the insertion groove 19 is formed on the adjuster element 1*b* at the level including the level at which the rocking edge 17 of the standard element 1*a* is situated. Therefore, the edge portion 18*c* of the adjuster element 1*b* serves as the rocking edge 17 of the standard element 1*a* under the condition in which the inserting member 18 is inserted into the insertion groove 19. Consequently, the adjuster element 1*b* is allowed to serve as the standard element 1*a* having the rocking edge 17.

Figure 8:
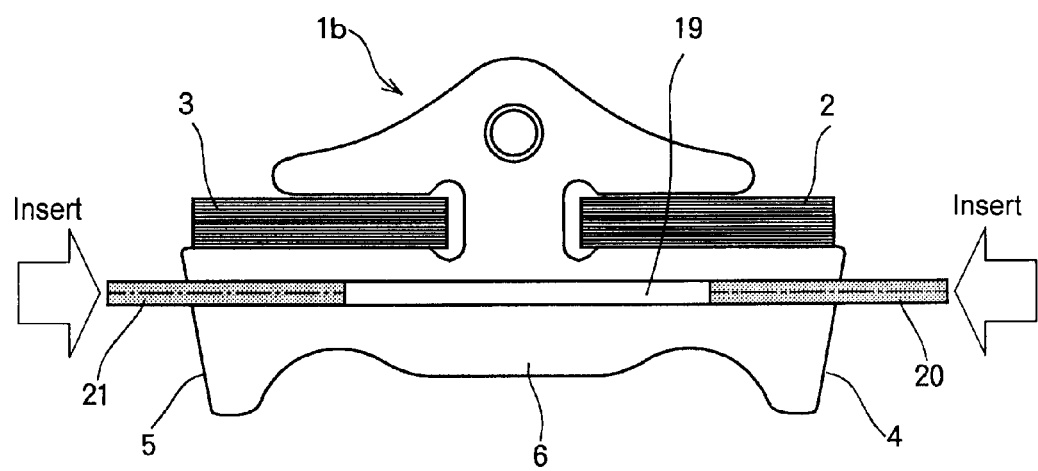
FIG. 8 is a sectional view showing a situation in which the inserting member of another configuration is inserted into the insertion groove formed on the adjuster element shown in FIGS. 3 and 4.
Figure 9:
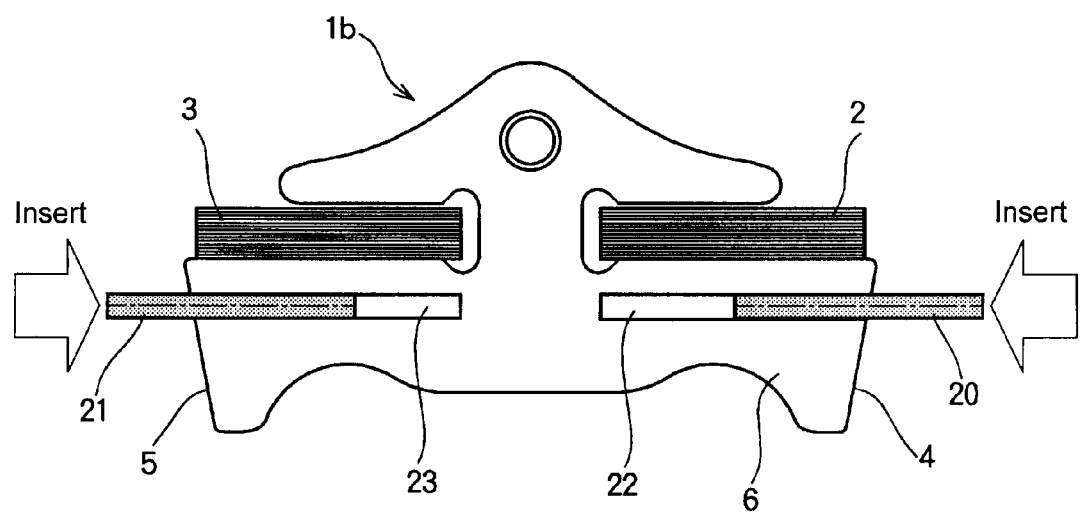
FIG. 9 is a sectional view showing a situation in which the inserting member of another configuration is inserted into the insertion groove of another configuration formed on the adjuster element shown in FIGS. 3 and 4.

Thus, FIG. 7 shows the example of inserting the inserting member 18 as a single rod member penetrating from the end face 4 to the end face 5. Alternatively, as shown in FIG. 8, the inserting member may be divided into two inserting members 20 and 21. In this case, the inserting member 20 is inserted into the insertion groove 19 from the end face 4, and the inserting member 21 is inserted into the insertion groove 19 from the end face 5. In addition, as shown in FIG. 9, the insertion groove 19 may also be divided into two insertion grooves 22 and 23. That is, the insertion groove may be formed without penetrating through the adjuster element 1*b* laterally from the end face 4 to the end face 5.

As described, according to the present invention, the driving belt B is assembled by fastening the plurality of standard elements 1*a* and the adjuster element(s) 1*b* thus structured using the rings 2 and 3. Specifically, the driving belt B is assembled by forming an element array by juxtaposing at least one adjuster element 1*b* before inserting the inserting member 18 into the insertion groove 19, and predetermined pieces of the standard element 1*a* in the same orientation and in a circular manner. Then, the rings 2 and 3 are individually inserted into the slits 9 and 10 of the standard elements 1*a* and the adjuster element(s) 1*b* thus forming the element array thereby fastening the element array. Thereafter, the inserting member 18 is inserted into the insertion groove 19 of the adjuster element 1*b* to fill in the endplay in the aligning direction of the element array. For this purpose, dimensions of the inserting member 18 are determined taking into consideration a distance of the endplay. Therefore, the endplay in the driving belt B can be reduced ideally to substantially zero by inserting the inserting member 18 thus designed into the insertion groove 19 as shown in FIGS. 7 to 9.

Figure 10:
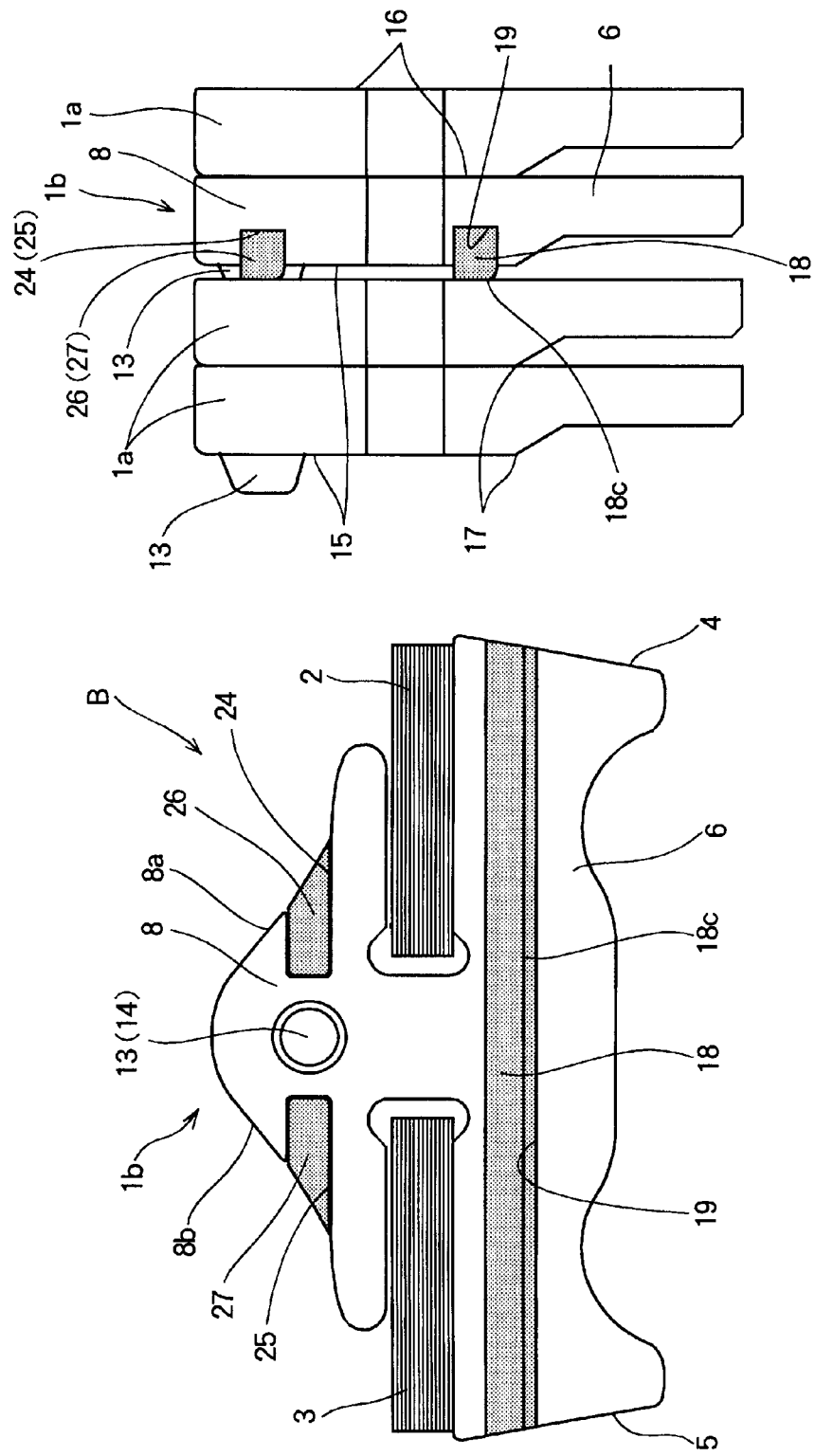
FIG. 10 is a front and side views schematically showing another example of the adjuster element used in the driving belt of the invention.

FIG. 10 shows an example of forming the insertion groove for inserting the inserting member thereto also in the head portion 8 of the adjuster element 1*b*, in addition to the base portion 6. That is, the examples shown in FIGS. 3 to 7 are configured to fill in the endplay only at the level in the vicinity of the level at which the rocking edge 17 of the standard element 1*a* is situated, by forming the insertion groove 19 only on the base portion 6 of the adjuster element 1*b*. Meanwhile, according to an example shown in FIG. 10, a pair of insertion grooves 24 and 25 is formed on the head portion 8 in addition to the insertion groove 19 formed on the base portion. Therefore, for the purpose of reducing the endplay, an inserting member 26 is inserted into the insertion groove 24, and, an inserting member 27 is inserted into the insertion groove 25.

Specifically, as shown in FIG. 10, the insertion grooves 24 and 25 are formed on the front face 15 of the head portion 8 of the adjuster element 1b. As the above-explained insertion groove 19, those insertion grooves 24 and 25 are formed to open to the front face 15, and the cross-section thereof is individually rectangular. More specifically, the insertion groove 24 is formed from one of the sides of the projection 13 to open also to an end face 8a. Meanwhile, the insertion groove 25 is formed from the other side of the projection 13 to open also to an end face 8b.

As the above-explained insertion member 18, each inserting member 26 and 27 is also a rod-like member whose cross-section is substantially rectangular, which is made of the same metal material as the standard element 1a and the adjuster element 1b, or which is made of other materials having strength or hardness similar to that of the standard element 1a and the adjuster element 1b. The inserting member 26 also comprises an engaging portion inserted into the insertion groove 24, and a contact face contacted with the element being opposed to the adjuster element 1b holding the inserting members 26 and 27 across the endplay. Likewise, the inserting member 27 also comprises an engaging portion inserted into the insertion groove 25, and a contact face contacted with the element being opposed to the adjuster element 1b holding the inserting members 26 and 27 across the endplay.

Therefore, according to the present invention, the driving belt B may also be assembled by fastening the plurality of standard elements 1a and the adjuster element(s) 1b as illustrated in FIG. 10 using the rings 2 and 3. Specifically, the driving belt B may also be assembled by forming an element array by juxtaposing at least one adjuster element 1b shown in FIG. 10 and predetermined pieces of the standard element 1a in the same orientation and in a circular manner. Then, the element array of the standard elements 1a and the adjuster element(s) 1b is fastened by the rings 2 and 3. Thereafter, the inserting member 18 is inserted into the insertion groove 19, the inserting member 26 is inserted into the insertion groove 24, and the inserting member 27 is inserted into the insertion groove 25. As a result, the endplay in the aligning direction of the driving belt B can be reduced.

Thus, in case of using the adjuster element 1b shown in FIG. 10 to form the driving belt B, the adjuster element 1b is contacted with the adjacent element E at two different levels, that is, at the level where the inserting member 18 is situated and at the level where the inserting member 26 and 27 are situated. For this reason, an attitude of the adjuster element 1b in the element array can be stabilized. Thus, according to the example shown in FIG. 10, the endplay in the driving belt B is reduced by inserting the inserting member at two different levels of the adjuster element 1b. Consequently, the adjuster element 1b is allowed to serve as the standard element 1a, and the stability of the driving belt B can be improved.

Figure 11:
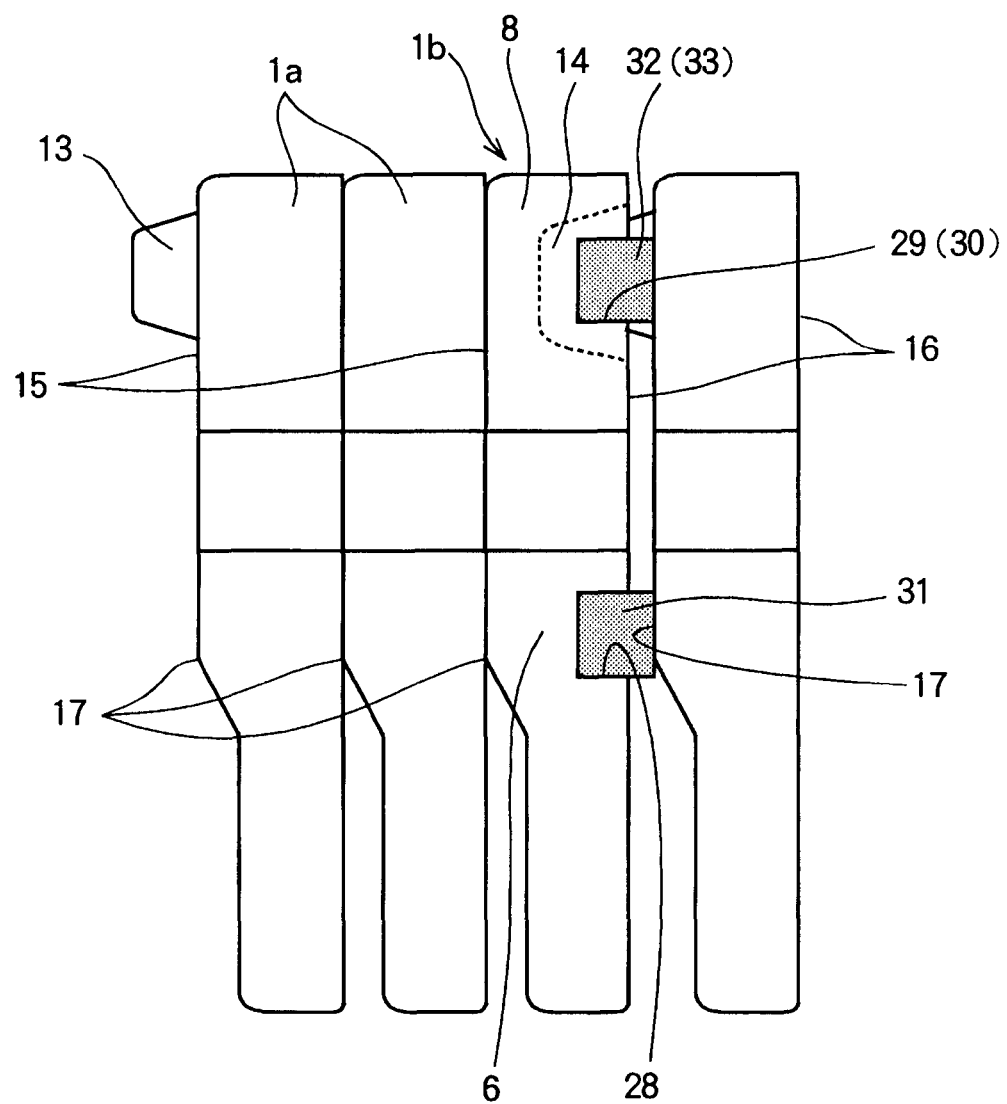
FIG. 11 is a side view schematically showing still another example of the adjuster element used in the driving belt of the invention.
Figure 12:
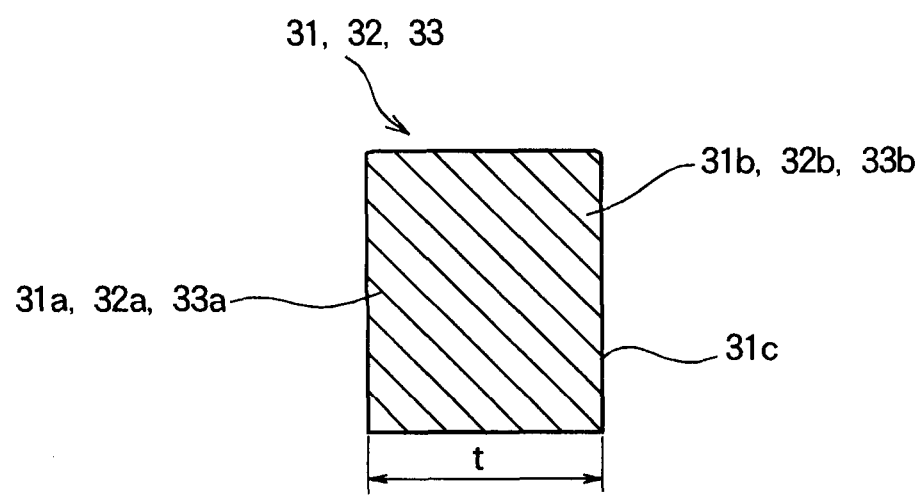
FIG. 12 is a sectional view showing a structure of the inserting member of the adjuster element shown in FIGS. 10 and 11.

Alternatively, as shown in FIGS. 11 and 12, the inserting member and insertion groove may also be arranged on the rear face 16 of the adjuster element 1b. As described, the examples shown in FIGS. 3 to 7 and 10 are configured to form the insertion groove 19 (or 24 and 25) on the front face 15 of the adjuster element 1b. That is, those insertion groove(s) is/are formed on the same face of the adjuster element 1b as the face of the standard element 1a in the aligning direction of the element array on which the rocking edge 17 is formed, and the inserting member(s) is/are inserted into the insertion groove(s) to fill in the endplay. Meanwhile, according to the example shown in FIGS. 11 and 12, an insertion groove 28, and insertion grooves 29 and 30 are formed on the rear face 16 of the adjuster element 1b, that is, on the face opposite to the face of the standard element 1a in the aligning direction of the element array on which the rocking edge 17 is formed. In this example, therefore, an inserting member 31 is inserted into the insertion groove 28, and inserting members 32 and 33 are inserted into the insertion grooves 29 and 30 respectively to fill in the endplay.

Specifically, as shown in FIG. 11, the insertion groove 28 is formed on the rear face 16 of the adjuster element 1b. The cross-section of the insertion groove 28 is also rectangular, therefore, the insertion groove 28 is open to the rear face 16, and also open to both of the end faces 4 and 5 thereby allowing the inserting member 31 to be inserted therein from the end face 4 (or 5) widthwise. In this example, the insertion groove 28 is formed on the adjuster element 1b at a level in the vicinity of the level of the rocking edge 17 of the standard element 1a juxtaposed in the element array. Meanwhile, the rocking edge 17 is formed on the front face 15 of the adjuster element 1b, that is, on the same face as the face of the standard element 1a in the aligning direction of the element array on which the rocking edge 17 is formed.

The inserting member 31 is also a rod member whose cross-section is rectangular as the aforementioned inserting members 18, 26 and 27, and also made of same metal material as the standard element 1a and the adjuster element 1b, or other materials having strength or hardness similar to that of the standard element 1a and the adjuster element 1b. As shown in FIG. 12, the inserting member 31 comprises an engaging portion 31a inserted into the insertion groove 28 to be engaged with the adjuster element 1b, and a contact face 31b to be contacted with the element being opposed to the adjuster element 1b holding the inserting member 31 across the endplay. The contact face 31b includes a flat face 31c. Specifically, the flat face 31b is formed in a manner to be contacted with the rocking edge 17 of the element opposed thereto, and to be parallel with the opposite face of the element opposed thereto on which the rocking edge 17 is not formed, in case the inserting member 31 is inserted into the insertion groove 28 to fill in the endplay. Therefore, the adjuster element 1b is allowed to serve as the standard element 1a having the rocking edge 17 by inserting the inserting member 31 is into the insertion groove 28.

Meanwhile, likewise the aforementioned insertion groove 28, the insertion grooves 29 and 30 are formed on the rear face 16 of the head portion 8 of the adjuster element 1b in a manner to open to the rear face 16 side, and a cross-section thereof is also rectangular. Specifically, the insertion groove 29 is formed from one of the sides of the hole 14 to open also to one of the end faces of the head portion 8. Meanwhile, the insertion groove 30 is formed from the other side of the hole 14 to open also to the other end face of the head portion 8.

Likewise the above-explained insertion members 18, 26 and 27, each inserting member 32 and 33 is also a rod member whose cross-section is substantially rectangular made of the same metal material as the standard element 1a and the adjuster element 1b, or other materials having strength or hardness similar to that of the standard element 1a and the adjuster element 1b. In addition, as shown in FIG. 12, the inserting member 32 also comprises an engaging portion 32a inserted into the insertion groove 29, and a contact face 32b contacted with the element being opposed to the adjuster element 1b holding the inserting member 32 across the endplay. Meanwhile, the inserting member 33 also comprises an engaging portion 33a inserted into the insertion groove 30, and a contact face 33b contacted with the element being opposed to the adjuster element 1b holding the inserting member 33 across the endplay.

Therefore, according to the present invention, the driving belt B may also be assembled by fastening the plurality of standard elements 1a and the adjuster element(s) 1b as illustrated in FIGS. 11 and 12 using the rings 2 and 3. Specifically, the driving belt B may also be assembled by forming an element array by juxtaposing at least one adjuster element 1b shown in FIGS. 11 and 12 before inserting the inserting members 31, 32 and 33 into the insertion grooves 28, 29 and 30, and predetermined pieces of the standard element 1a in the same orientation and in a circular manner. Then, the element array of the standard elements 1a and the adjuster element(s) 1b is fastened by the rings 2 and 3. Thereafter, the inserting member 31 is inserted into the insertion groove 28, the inserting member 32 is inserted into the insertion groove 29, and the inserting member 33 is inserted into the insertion groove 30. As a result, the endplay in the aligning direction of the driving belt B thus structured can be reduced.

Thus, in case of using the adjuster element 1b shown in FIGS. 11 and 12 to form the driving belt B, the adjuster element 1b is contacted with the adjacent element E at two different levels, that is, at the level where the inserting member 31 is situated and at the level where the inserting members 32 and 33 are situated, as the example shown in FIG. 10. For this reason, an attitude of the adjuster element 1b in the element array can be stabilized. In addition, according to the example shown in FIGS. 11 and 12, the insertion groove 28 to which the inserting member 31 is inserted is formed on the rear face 16 of the adjuster element 1b. Therefore, the inserting member 31 is not required to function as a rocking edge so that it is unnecessary to form a curved face or an edge on the contacting face 31b. For this reason, the driving belt B can be manufactured easily in comparison with a case in which the curved face or edge is formed on the contacting face 31b.

Figure 13:
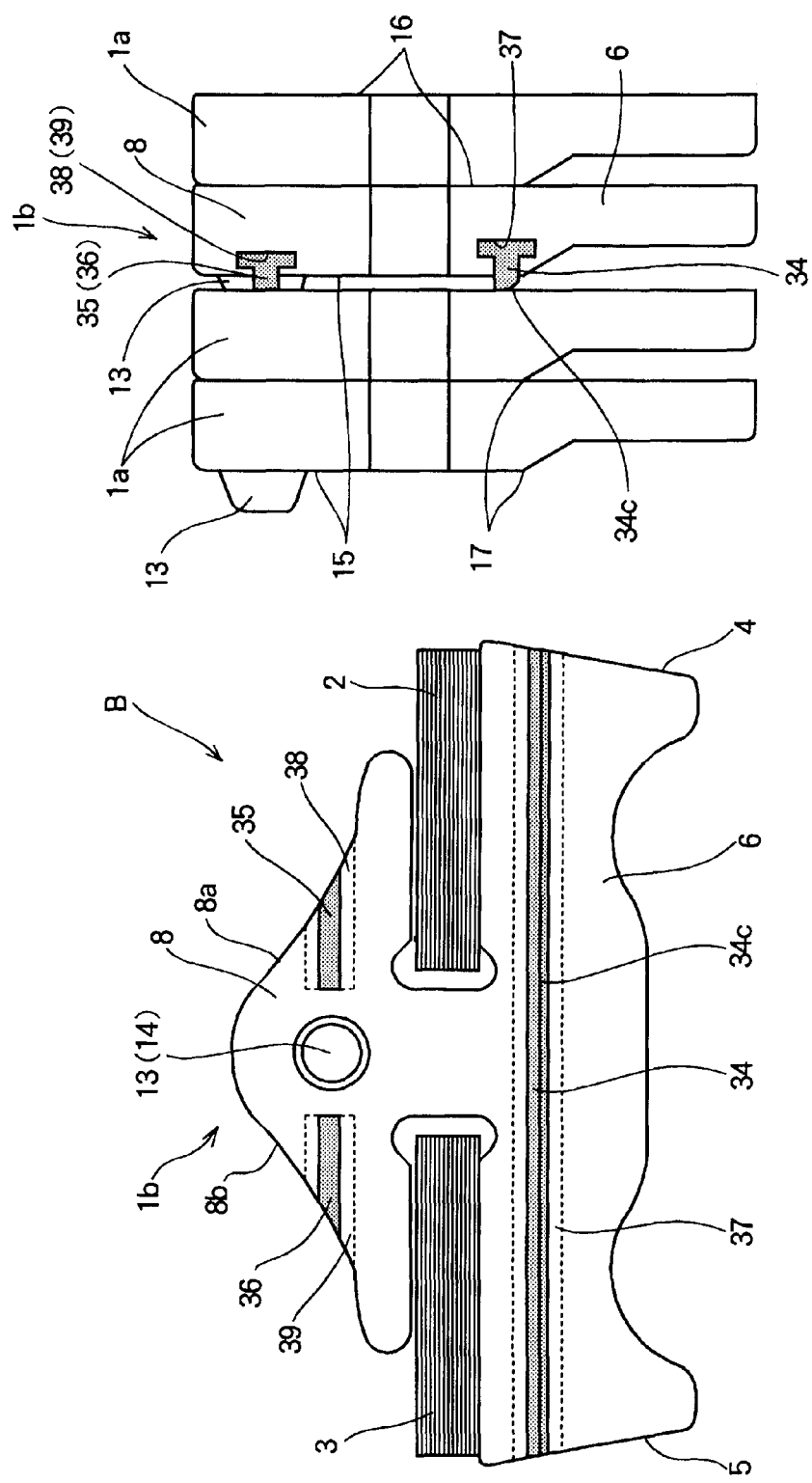
FIG. 13 is a front and side views schematically showing still another example of the adjuster element used in the driving belt of the invention.

FIG. 13 shows an example of preventing a disengagement of the inserting member from the insertion groove of the adjuster element 1b by engaging the inserting member with the insertion groove. According to the above-explained examples, the inserting member whose cross-section is rectangular is inserted into the insertion groove whose cross-section is also rectangular. On the other hand, according to the example shown in FIG. 13, a cross-section of each inserting member 34, 35 and 36 is T-shape, and the inserting members 34, 35 and 36 are inserted into insertion grooves 37, 38 and 39 respectively.

Figure 14:
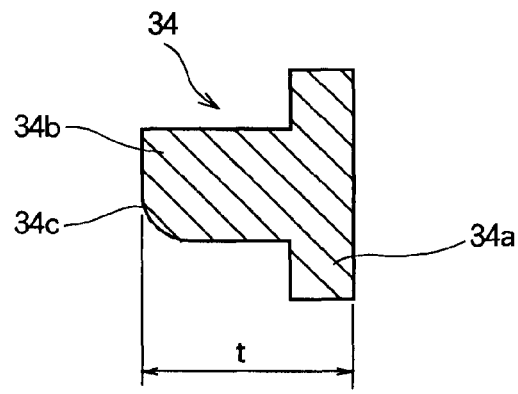
FIG. 14 is a sectional view showing a structure of the inserting member of the adjuster element shown in FIG. 13.

Specifically, the inserting member 34 is a rod member whose cross-section is T-shape. The inserting member 34 is also made of the same metal material as the standard element 1a and the adjuster element 1b, or other materials having strength or hardness similar to that of the standard element 1a and the adjuster element 1b. As shown in FIG. 14, the inserting member 34 comprises an engaging portion 34a inserted into the insertion groove 37, and a contact face 34b contacted with the element being opposed to the adjuster element 1b holding the inserting member 34 across the endplay. In addition, an edge portion 34c is formed on the contact face 34b. Therefore, the edge portion 34c serves as a rocking edge as the aforementioned rocking edge 17 under the situation in which the inserting member 34 is inserted into the insertion groove 37 to fill in the endplay.

Figure 15:
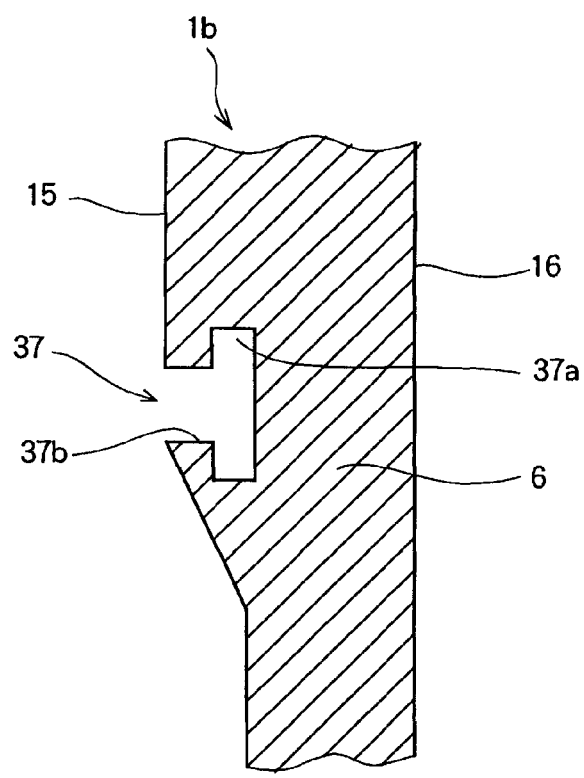
FIG. 15 is a sectional view showing a structure of the insertion groove formed on the adjuster element shown in FIG. 13.

On the other hand, the insertion groove 37 to which the inserting member 34 is inserted is formed on the base portion 6 of the adjuster element 1b, and a cross-section thereof is also T-shape. Specifically, as shown in FIG. 15, the insertion groove 37 comprises a engaging groove 37a to which the engaging portion 34a of the inserting member 34 is inserted, and an opening portion 37b opening toward the front face 15 whose opening width is narrower than a groove width of the engaging groove 37a. Thus, the insertion groove 37 is formed as a dovetail groove whose cross-section is T-shape. In addition, in order to allow the inserting member 34 to be inserted into the insertion groove 37 laterally from the end face 4 (or 5) of the adjuster element 1b, the insertion groove 37 is also open to both lateral ends as shown in FIG. 13. Alternatively, the insertion groove 37 may also be formed into a common dovetail groove having a trapezoidal cross-section. In this case, the engaging member 34a of the inserting member 34 is formed to have a trapezoidal cross-section to be fitted into the insertion groove 37.

Specifically, the insertion groove 37 is formed on the adjuster element 1b on the same side as the face of the standard element 1a on which the rocking edge 17 is formed, in the aligning direction of the element array. In addition, the insertion groove 37 is formed at a level in the vicinity of the level at which the rocking edge 17 is formed on the standard element 1a. Therefore, the adjuster element 1b is allowed to serve as the standard element 1a having the rocking edge 17 by inserting the inserting member 37 thus having the edge portion 34c into the insertion groove 37.

Figure 16:
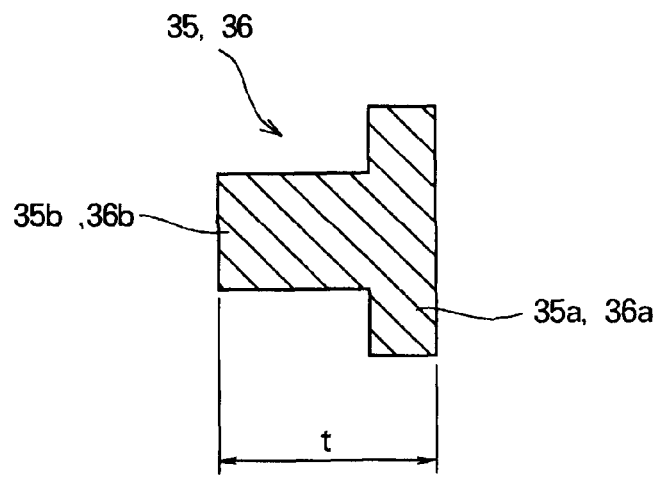
FIG. 16 is a sectional view showing a structure of the inserting member of the adjuster element shown in FIG. 13.

Likewise the example shown in FIG. 10, the insertion grooves 38 and 39 are formed on the head portion 8 of the adjuster element 1b, and the inserting members 35 and 36 are inserted respectively thereto. Specifically, as shown in FIG. 16, the inserting member 35 comprises an engaging portion 35a which is inserted into the insertion groove 38 to be engaged with the adjuster element 1b, and a contact face 35b which is contacted with the element being opposed to the adjuster element 1b holding the inserting member 35 across the endplay. Likewise, the inserting member 36 comprises an engaging portion 36a which is inserted into the insertion groove 39 to be engaged with the adjuster element 1b, and a contact face 36b which is contacted with the element being opposed to the adjuster element 1b holding the inserting member 36 across the endplay.

Figure 17:
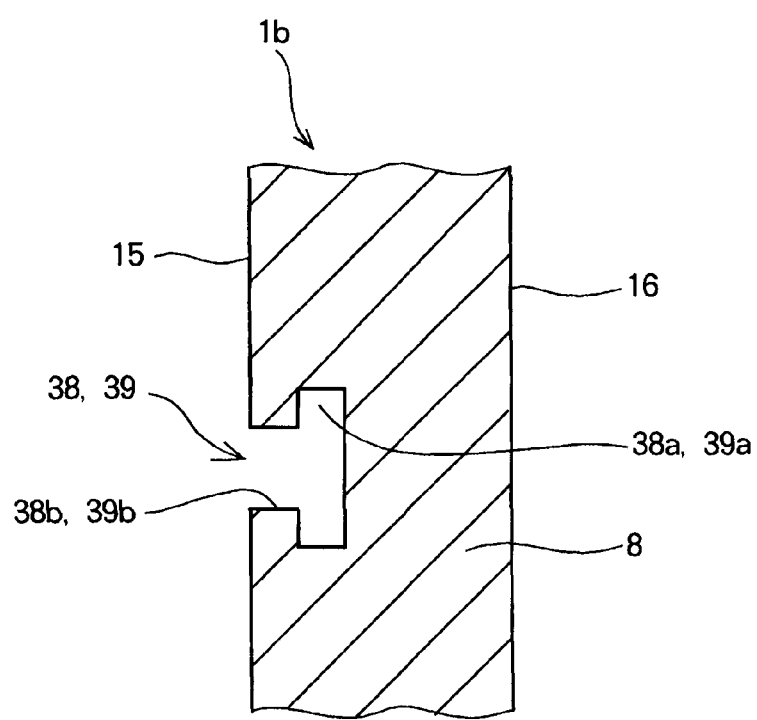
FIG. 17 is a sectional view showing a structure of the insertion groove formed on the adjuster element shown in FIG. 13.

Meanwhile, the insertion grooves 38 and 39 are formed respectively on the front face 15 of the head portion 8 of the adjuster element 1b. Specifically, as shown in FIG. 17, the insertion groove 38 comprises an engaging groove 38a to which the engaging portion 35a of the inserting member 35 is inserted, and an opening portion 38b opening toward the front face 15 whose opening width is narrower than a groove width of the engaging groove 38a. Thus, the insertion groove 38 is formed as a dovetail groove whose cross-section is T-shape. Likewise, the insertion groove 39 also comprises an engaging groove 39a to which the engaging portion 36a of the inserting member 36 is inserted, and an opening portion 39b opening toward the front face 15 whose opening width is narrower than a groove width of the engaging groove 39a. Thus, the insertion groove 39 is formed as a dovetail groove whose cross-section is T-shape. In addition, the insertion groove 38 is formed from one of the sides of the projection 13 to open also to an end face 8a. Meanwhile, the insertion groove 39 is formed from the other side of the projection 13 to open also to an end face 8b. Alternatively, as the insertion groove 37 and the inserting member 37, the insertion grooves 38 and 39 may also be formed respectively into a common dovetail groove having a trapezoidal cross-section. In this case, the engaging portions 35a and 35b of the inserting members 35 and 36 are formed to have a trapezoidal cross-section respectively to be fitted into the insertion groove 38 and 39.

Therefore, according to the present invention, the driving belt B may also assembled by fastening the plurality of standard elements 1a and the adjuster element(s) 1b as illustrated in FIG. 13 using the rings 2 and 3. Specifically, the driving belt B may also be assembled by forming an element array by juxtaposing at least one adjuster element 1b shown in FIG. 13 before inserting the inserting members 34, 35 and 36 into the insertion grooves 37, 38 and 39, and predetermined pieces of the standard element 1a in the same orientation and in a circular manner. Then, the element array of the standard elements 1a and the adjuster element(s) 1b is fastened by the rings 2 and 3. Thereafter, the inserting member 34 is inserted into the insertion groove 27, the inserting member 35 is inserted into the insertion groove 38, and the inserting member 36 is inserted into the insertion groove 39. As a result, the endplay in the aligning direction of the driving belt B thus structured can be reduced.

Thus, in case of using the adjuster element 1b shown in FIG. 13 to form the driving belt B, the inserting members 34, 35 and 36 inserted respectively into the inserting members 34, 35 and 36 to fill in the endplay in the driving belt B can be engaged respectively therewith. Therefore, the inserting members 34, 35 and 36 can be prevented from being disengaged from the adjuster element 1b shown in FIG. 13 after assembling the driving belt B by fastening the array of the adjuster element 1b and the standard element 1a using the rings 2 and 3. For this reason, the driving belt B can be manufactured rigidly while reducing the endplay thereof ideally.

Thus, in case of using the adjuster element 1b shown in FIG. 13 to form the driving belt B, the adjuster element 1b is contacted with the adjacent element E at two different levels, that is, at the level where the inserting member 34 is situated and at the level where the inserting member 35 and 36 are situated, as the example shown in FIG. 10. Therefore, an attitude of the adjuster element 1b in the element array can be stabilized.

As described, the example shown in FIG. 13 is configured to prevent a detachment of each inserting members 34, 35 and 36 from the adjuster element 1b thus structured in the aligning direction of the array of the elements E, by engaging the inserting members 34, 35 and 36 with the insertion grooves 37, 38 and 39 respectively. That is, the adjuster element shown 1b shown in FIG. 13 comprises an "disengagement preventing means" of the present invention, which prevents disengagement of the inserting members 34, 35 and 36 from the insertion grooves 37, 38 and 39, by engaging the inserting members 34, 35 and 36 with the insertion grooves 37, 38 and 39 respectively. Thus, the example of the "disengagement preventing means" shown in FIG. 13 is configured to prevent the disengagement of the inserting member from the insertion groove basically in the aligning direction of the array of the elements E. However, according to the present invention, the "disengagement preventing means" may also be configured to prevent disengagement of the inserting member from the insertion groove in the width direction of the adjuster elements 1b.

Figure 18:
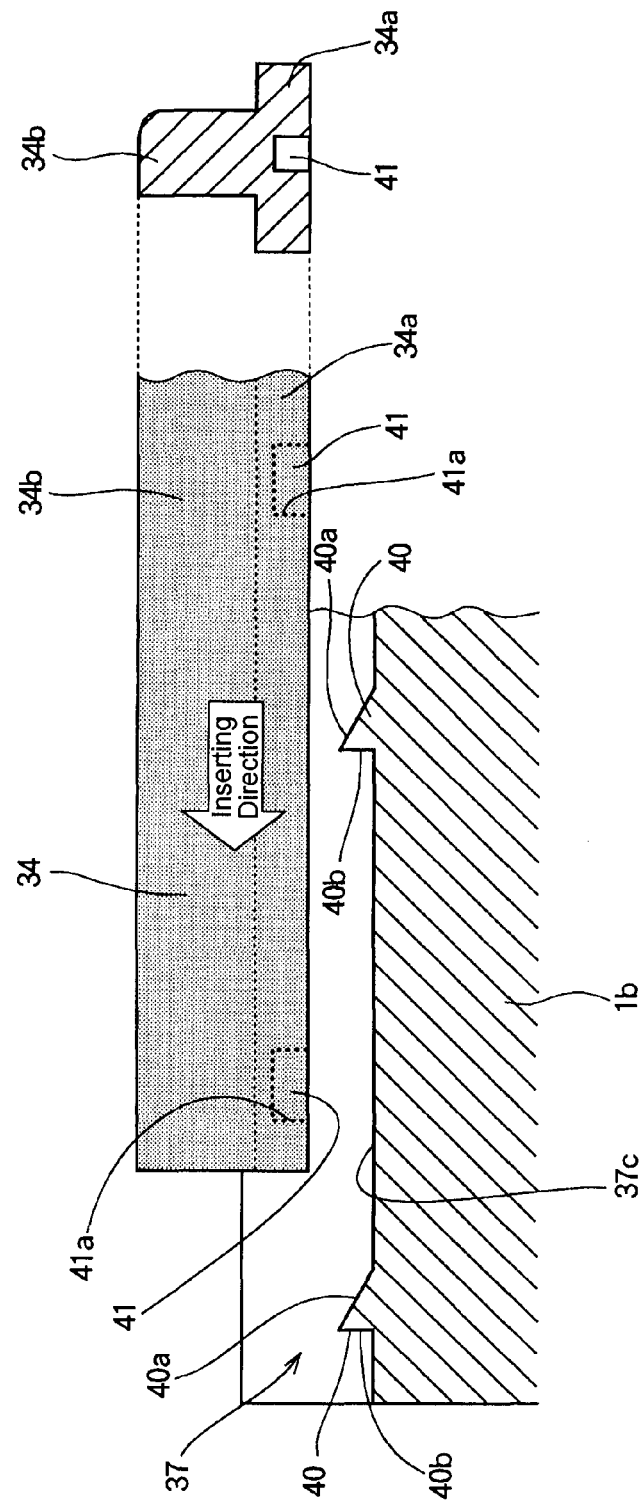
FIG. 18 is a view schematically showing an example of the inserting member and the insertion groove of the adjuster element to form a "disengagement preventing means".

For this purpose, as shown in FIG. 18, a projection 40 is formed wedgewise on a bottom face 37c of the insertion groove 37. Specifically, the projection 40 comprises an inclined face 40a rising gradually from the bottom face 37c in an inserting direction of the inserting member 34, and an engagement face 40b configured to be engaged with an after-mentioned engagement hole 41 of the inserting member 34.

Meanwhile, the engagement hole 41 is formed on the engaging portion 34a of the inserting member 34 in a manner to be opposed to the bottom face 37c. Thus, the engagement hole 41 is configured to accommodate the projection 40 therein, and an engagement face 41a is formed therein. Therefore, the inserting member 34 is engaged with the engagement face 40b of the projection 40 at the engagement face 41a under the condition in which the inserting member 34 is inserted into the insertion groove 37 completely.

Thus, a disengagement of the inserting member 34 inserted into the insertion groove 37 in the inserting direction, that is, in the width direction of the element can be prevented easily by engaging the projection 40 formed on the insertion groove 37 with the engagement hole 41 formed on the inserting member 34.

FIG. 18 shows an example of forming the projection 40 on the insertion groove 37, and forming the engagement hole 41 on the inserting member 34 respectively. However, disengagement of the inserting member 35 from the insertion groove 38 in the inserting direction may also be prevented by forming the projection 40 on the insertion groove 38 while forming the engagement hole 41 on the inserting member 35. Likewise, disengagement of the inserting member 36 from the insertion groove 39 in the inserting direction may also be prevented by forming the projection 40 on the insertion groove 39 while forming the engagement hole 41 on the inserting member 36. In addition, although two pairs of projection 40 and engagement hole 41 are provided in the example shown in FIG. 18, the inserting member 34 can be engaged with the insertion groove 37 by forming at least one pair of projection 40 and the engagement hole 41 at a portion where the those elements are engaged to each other under the condition in which the inserting member 34 is inserted into the insertion groove 37 completely.

Figure 19:
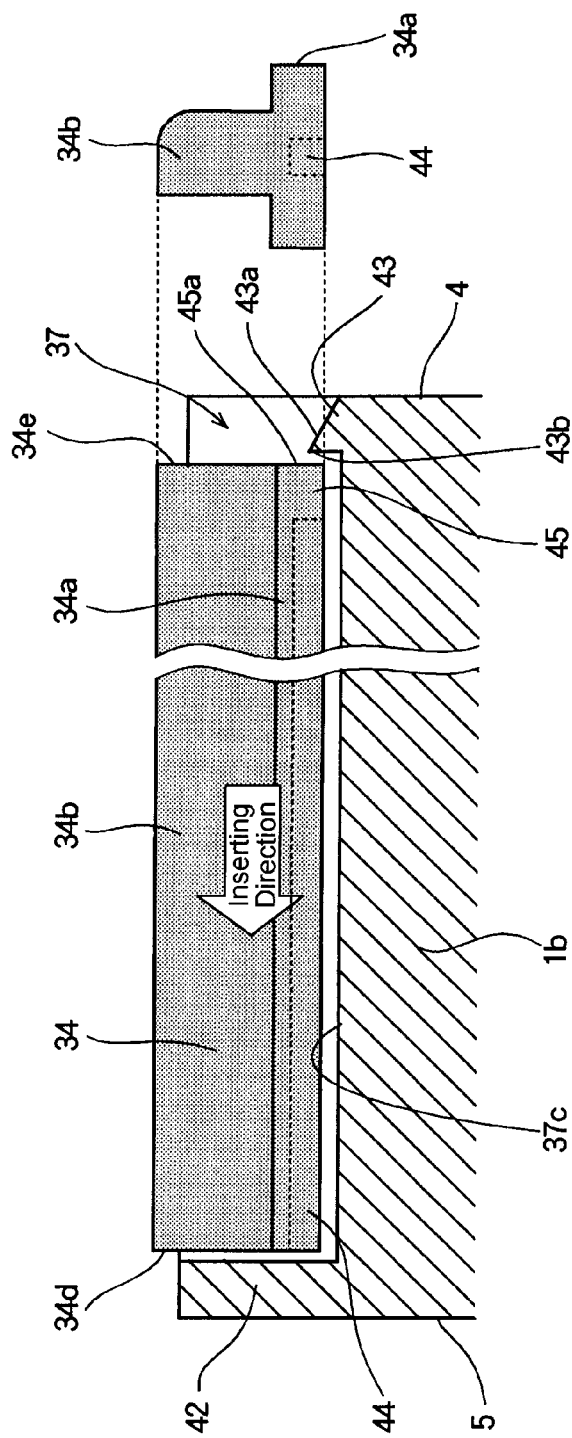
FIG. 19 is a view schematically showing another example of the inserting member and the insertion groove of the adjuster element to form another "disengagement preventing means".
Figure 20:
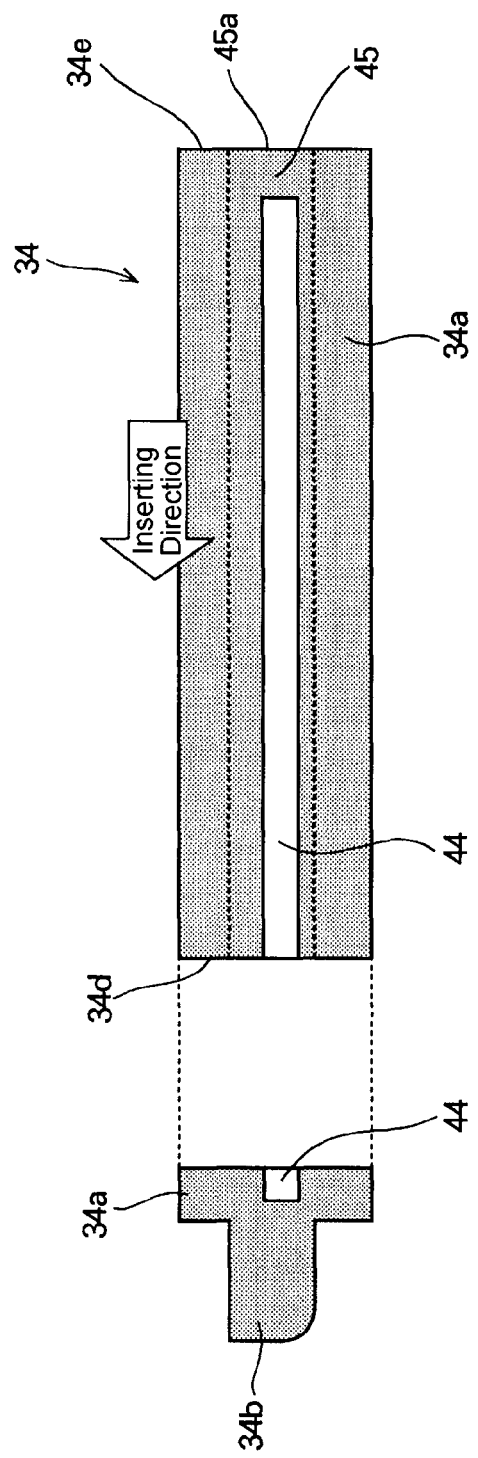
FIG. 20 is a view schematically showing still another example of the inserting member and the insertion groove of the adjuster element to form still another "disengagement preventing means".

Another example of the "disengagement preventing means" is shown in FIGS. 19 and 20. In the example shown in FIGS. 19 and 20, a stopper portion 42 is formed on one of the end portion of the insertion groove 37 (i.e., on the end face 5 side in FIG. 19), and a projection 43 is formed wedgewise on the other end of the insertion groove 37 (i.e., on the end face 4 side in FIG. 19). Therefore, a front end face 34d of the inserting member 34 is stopped by the stopper portion 42 when inserted into the insertion groove 37. Specifically, the stopper portion 42 can be formed by closing the insertion groove 37 at the side of the end face 5. Meanwhile, the projection 43 comprises an inclined face 43a rising gradually from the bottom face 37c in the inserting direction of the inserting member 34, and an engagement face 43b configured to be engaged with an after-mentioned engagement end 45 of the inserting member 43.

In this example, the engaging portion 34a of the inserting member 34 comprises a guide groove 44 opening toward the bottom face 37c, and the engagement end 45 configured to be engaged with the projection 43. Specifically, the guide groove 44 is fitted onto the projection 43 thereby guiding the inserting member 34 along the projection 43. For this purpose, as shown in FIG. 20, the guide groove 44 is formed to be opened toward the front end face 34d in the inserting direction of the inserting member 34, and closed at the rear end face 34e side. Therefore, the engagement end 45 is formed between an end face of the guide groove 44 of the rear end face 34e side and the rear end face 34e. In addition, a contacting face 45a is formed on the engagement end 45, which is engaged with the engagement face 43b of the projection 43 under the condition in which the inserting member 34 is inserted into the insertion groove 37 completely.

Thus, disengagement of the inserting member 34 inserted into the insertion groove 37 in the inserting direction, that is, in the width direction of the element E can be prevented easily by forming the guide groove 44 in the inserting member 34, while forming the stopper portion 42 and the projection 43 on the insertion groove 37.

FIG. 19 shows an example of forming the guide groove 44 on the inserting member 34, and forming the stopper portion 42 and the projection 43 on the insertion groove 37 respectively. However, detachment of the inserting member 35 from the insertion groove 38 in the inserting direction may also be prevented by forming the guide groove 44 in the inserting member 35, while forming the stopper portion 42 and the projection 43 on the insertion groove 38. Likewise, detachment of the inserting member 36 from the insertion groove 39 in the inserting direction may also be prevented by forming the guide groove 44 in the inserting member 36, while forming the stopper portion 42 and the projection 43 on the insertion groove 39.

Figure 21:
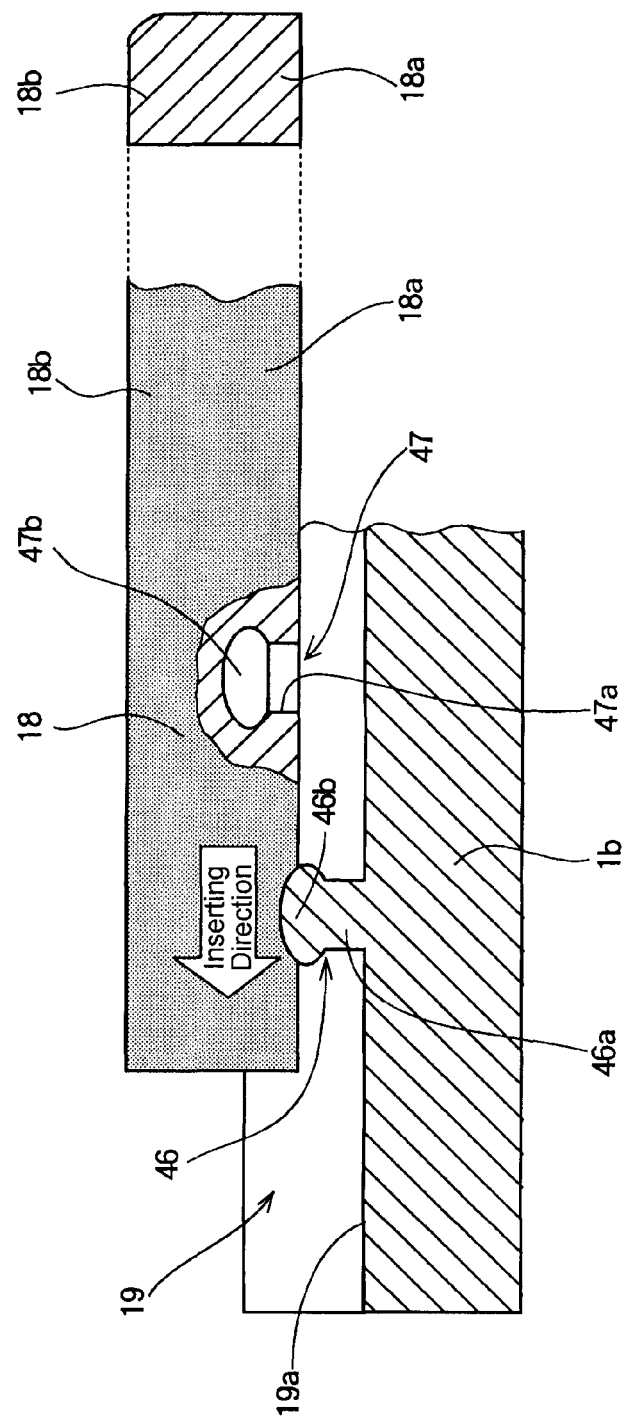
FIG. 21 is a view schematically showing still another example of the inserting member and the insertion groove of the adjuster element to form still another "disengagement preventing means".

Still another example of the "disengagement preventing means" is shown in FIG. 21. The example shown in FIG. 21 is configured to prevent disengagement of the inserting member 18 whose cross-section is rectangular shown in FIGS. 3, 4 and 10 etc. from the adjuster element $1b$ having the insertion groove 19 to which the inserting member 18 is inserted, in both aligning direction and width direction of the element E. For this purpose, according to the example shown in FIG. 21, an engagement projection 46 is formed on a bottom face $19a$ of the insertion groove 19. Specifically, the engagement projection 46 comprises a column $46a$ projecting integrally from the bottom face $19a$, and an engagement head $46b$ which is diametrically larger than the column $46a$ and which is inserted into the an after-mentioned engagement hole 47 of the inserting member 18. Alternatively, the engagement projection 46 may be made of elastic member having a predetermined elasticity and fixed integrally to the bottom face $19a$.

Meanwhile, the engagement hole 47 is formed on the engaging portion $18a$ of the inserting member 18 in a manner to open to the bottom face $19a$. Specifically, the engagement hole 47 is configured to be engaged with the engagement projection 46 under the condition in which the inserting member 18 is inserted into the insertion groove 19 completely. For this purpose, the engagement hole 47 comprises: an opening $47a$, which is diametrically larger than the column $46a$ but diametrically smaller than the maximum outer diameter of the engagement head $46b$; and a holding space $47b$, which is diametrically larger than an inner diameter of the opening $47a$, and which is engaged with the engagement head $46b$.

Thus, disengagement of the rectangular inserting member 18 inserted into the rectangular insertion groove 19 in both of the inserting direction, that is, in the width direction and the aligning direction of the element E can be prevented easily by engaging the engagement projection 46 formed on the insertion groove 19 with the engagement hole 47 formed on the inserting member 18.

In addition to the above-explained example, for example, the "disengagement preventing means" of the present invention may also be formed by narrowing the width of the insertion groove partially to be narrower than the engagement portion of the inserting member inserted thereto, otherwise, by widening the width of the engagement portion of the inserting member to be inserted into the insertion groove partially to be wider than the insertion groove. Alternatively, the "disengagement preventing means" of the present invention may also be formed by increasing a friction coefficient of the insertion groove partially to increase a friction between the insertion groove and the engagement portion of the inserting member inserted thereto, otherwise, by increasing a friction coefficient of the engagement portion of the inserting member partially to increase a friction between the insertion groove and the engagement portion inserted thereto.

Thus, according to the present invention, the driving belt B may also be assembled easily by fastening the plurality of elements E including the adjuster element(s) $1b$ thus structured using the rigs 2 and 3, while adjusting the endplay in the driving belt B. Specifically, the driving belt B is assembled by forming an element array by juxtaposing at least one adjuster element $1b$ before inserting the inserting member 18 shown in FIGS. 3, 4 and etc. into the insertion groove 19, and predetermined pieces of the standard element $1a$ in the same orientation and in a circular manner. All of the desired number of standard elements $1a$ and the adjuster element(s) $1b$ can be fastened easily by the rings 2 and 3, before reducing the endplay in the aligning direction of the element array thus formed. Then, the inserting member(s) 18 is/are inserted into the endplay in the element array to fill in the endplay. For this purpose, dimensions of the inserting member 18 are determined taking into consideration a distance of the endplay. Therefore, the endplay in the driving belt B can be ideally reduced to substantially zero.

As a result of thus reducing the endplay, a transmission loss resulting from a slippage between the element E and the rings 2 and 3 can be reduced so that the power transmitting efficiency of the driving belt B is improved. That is, the driving belt B can be assembled easily without degrading the power transmitting efficiency by thus using the adjuster element $1b$. In other words, both of the easiness of assembling the driving belt B and the power transmitting efficiency of assembling the driving belt B can be improved.

(Assembling Method of Driving Belt)

Figure 22:
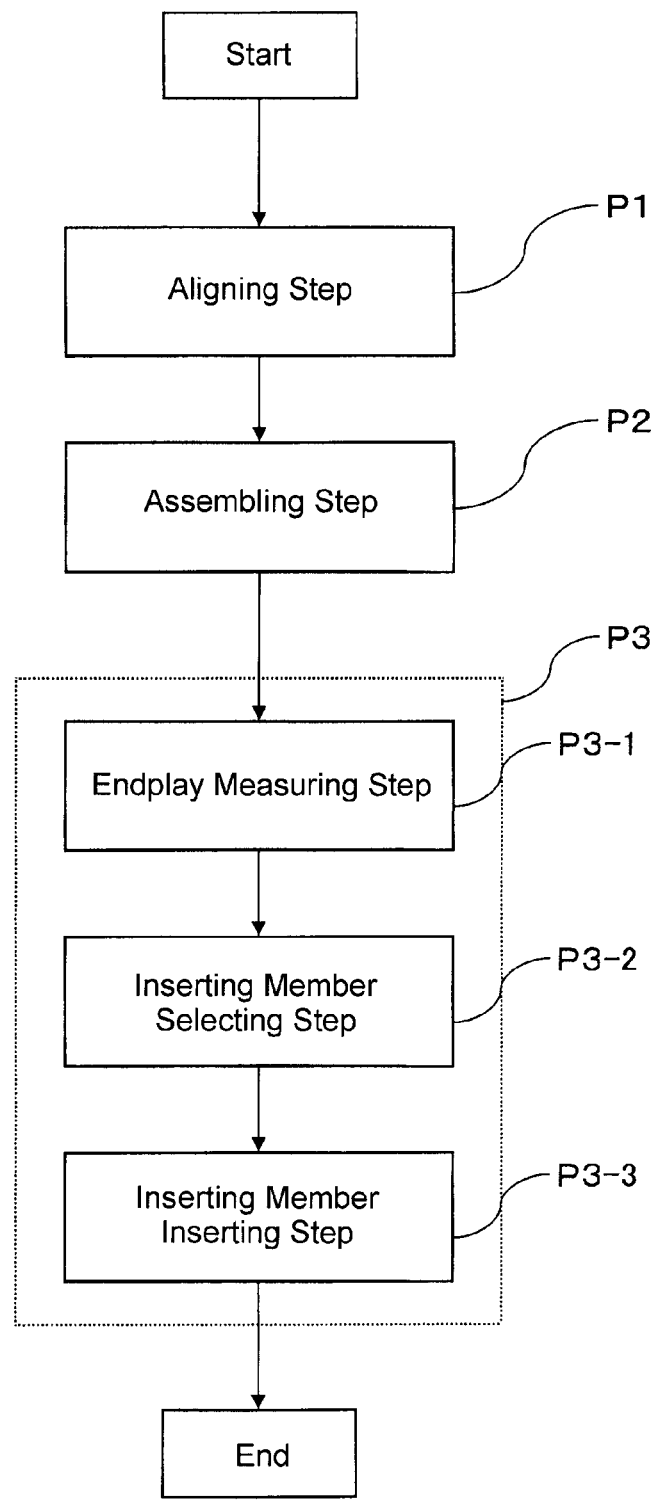
FIG. 22 is a process chart explaining assembling method of the driving belt using the adjuster element according to the present invention.

Next, here will be explained a method for assembling the driving belt of the present invention. As shown in FIG. 22, according to the present invention, the assembling method of the driving belt comprises an aligning step (Process P1), an assembling step (Process P2), and an endplay adjusting step (Process P3).

At the aligning step, a plurality of the standard element $1a$ and at least one adjuster element $1b$ before inserting the inserting member into the insertion groove are juxtaposed by inserting the projection 13 of the element E into the hole 14 of the adjoining element. Specifically, first of all, a predetermined number of the standard elements $1a$ and the adjuster element(s) $1b$ are prepared to assemble the driving belt. That is, a total required number of the element E including the standard elements $1a$ and at least one adjuster element $1b$ before inserting the inserting member into the insertion groove are prepared. Then, those standard elements $1a$ and the adjuster element(s) $1b$ are juxtaposed in a same orientation and in a same direction thereby inserting the projection 13 into the hole 14 of the adjoining element respectively. For example, the predetermined number of the standard elements $1a$ and the adjuster element(s) $1b$ are juxtaposed along one of the rings 2 and 3 (e.g., the ring 3) in a circular manner using an aligning tool or the like. For this purpose, the element array is required to contain at least one adjuster element $1b$. However, a plurality of adjuster elements $1b$ may also be used in the element array. In this case, the standard elements $1a$ and the adjuster elements $1b$ are juxtaposed in a manner to situate the adjuster elements $1b$ at equal intervals in the length direction of the driving belt B.

At the assembling step, the array of the elements E consisting of the standard elements $1a$ and the adjuster element(s) $1b$ thus aligned at the above-explained aligning step is fastened by the rings 2 and 3. Specifically, for example, the ring 3 is inserted into the slit 10 of the elements E to align the element array in a circular manner. Then, the ring 2 is inserted into the other slit 9 of the elements E thus aligned. As a result, the standard elements $1a$ and the adjuster element(s) $1b$ are fastened by the rings 2 and 3 in a circular manner.

As described, an endplay remains inevitably in the element array of the standard elements 1*a* and the adjuster element(s) 1*b* thus fastened by the rings 2 and 3, in the aligning direction of the elements, that is, in the length direction of the rings 2 and 3. If the endplay in the driving belt B is too large, a slippage between the element E and the rings 2 and 3 is increased when the driving belt B applied to the pulley P is subjected to a load. As a result, a transmission loss resulting from the slippage is increased. Therefore, the endplay in the driving belt B is preferably reduced as small as possible. According to the assembling method of the present invention, such endplay is reduced at the subsequent endplay adjusting step using the above-explained adjuster element 1*b*.

After thus fastening the standard elements 1*a* and the adjuster element(s) 1*b* by the rings 2 and 3, at the subsequent endplay adjusting step, the endplay is reduced by inserting the inserting member (e.g., the inserting member 18, 20, 21, 26, 27 or 31-36) into the insertion groove (e.g., the insertion groove 19, 22-25, 28-30 or 37-39) from the end face 4 and/or the end face 5 of the adjuster element 1*b*. Specifically, as shown in FIG. 22, the endplay adjusting step includes an end play measuring step (Process P3-1), an inserting member selecting step (Process P3-2) and an inserting member inserting step (Process P3-2).

At the endplay adjusting step, first of all, the endplay measuring step is carried out to measure the endplay in the aligning direction of the element array fastened in a circular manner by the rings 2 and 3. Specifically, clearances between the adjacent elements E in the element array is collected in a clearance between the front face 15 of (one of) the adjuster element(s) 1*b* and the rear face 16 of the adjoining element, or in a clearance between the rear face 16 of (one of) the adjuster element(s) 1*b* and the front face 15 of the adjoining element. Then, a distance of the endplay thus corrected is measured. For example, the endplay thus corrected can be measured easily by using a clearance gauge or specific measuring apparatus.

Then, the inserting member selecting step is carried out to determine a thickness of the inserting member to be inserted into the insertion groove of the adjuster element 1*b* based on the actual length of the endplay measured at the endplay measuring step. According to the present invention, the inserting member of the adjuster element 1*b* can be selected from plural different types of inserting members having different thicknesses in the direction of the endplay represented by "t" in FIGS. 5, 12, 14 and 16. Therefore, the inserting member having a thickness appropriate to reduce the endplay of the assembled driving belt B to a target value is selected based on the measured actual value of the endplay. The target value of the endplay may be determined to a most appropriate value in advance from experiment or experience. In addition, the thicknesses of the inserting member to be selected according to the measured actual value of the endplay can be calculated in advance taking into consideration the measured actual value of the endplay and deformation of rings 2 or 3, and tabulated or stored in a computer program.

Then, at the inserting member inserting step, the inserting member selected at the inserting member selecting step is inserted into the insertion groove of the adjuster element 1*b* in the element array fastened in a circular manner to fill in the endplay. Consequently, the assembling work of the driving belt B is completed. Specifically, the inserting member having a thickness selected at the inserting member selecting step is inserted into the insertion groove from one of the end faces 4 and 5 of the adjuster element 1*b* to fill in the endplay.

For example, in case of using the adjuster element 1*b* having the inserting member 18 and insertion groove 19 configured as shown in the FIGS. 3 and 4, the inserting member 18 is inserted into the insertion groove 19 from one of the and face 4 and 5 to fill in the endplay. In case of using the adjuster element 1*b* shown in FIG. 8 in which the inserting member is divided into the inserting members 20 and 21, the inserting members 20 is inserted into insertion groove 19 from the end face 4 side, and the inserting members 21 is inserted into insertion groove 19 from the end face 5 side simultaneously or sequentially. Likewise, in case of using the adjuster element 1*b* shown in FIG. 9 in which insertion groove is divided into the insertion grooves 22 and 23, the inserting member 21 is inserted into the insertion groove 22 from the end face 4 side, and the inserting member 21 is inserted into the insertion groove 23 from the end face 5 side simultaneously or sequentially. In case of using the adjuster element 1*b* shown in FIGS. 10 and 11 in which the insertion grooves are formed also on the head portion 8, the inserting member 18 is inserted into the insertion groove 19 from one of the end faces 4 and 5 to fill in the endplay, and in addition, the inserting member 26 is inserted into the insertion groove 24 and the inserting member 27 is inserted into the insertion groove 25 simultaneously or sequentially. Likewise, in case of using the adjuster element 1*b* shown in FIG. 13, the inserting member 34 is inserted into the insertion groove 37 from one of the end faces 4 and 5 to fill in the endplay, and in addition, the inserting member 35 is inserted into the insertion groove 38 and the inserting member 36 is inserted into the insertion groove 39 simultaneously or sequentially.

After the endplay is reduced to zero or to the predetermined target value by thus inserting the inserting member(s) into the insertion groove(s), the assembling work of the driving belt B is completed. The inserting member inserted completely into the insertion groove is kept engaged with the insertion groove by the friction acting therebetween and the friction acting between the inserting member and the adjoining element E contacted thereto. However, a disengagement of the inserting member from the insertion groove may also be prevented by welding the inserting member with the insertion groove or using adhesive agent.

Meanwhile, in case of using the adjuster element 1*b* having the inserting member 34 and insertion groove 37 configured as shown in the FIG. 18 or 19, the inserting member 34 is engaged with the insertion groove 37 by inserting the inserting member 34 into the insertion groove 37 completely. Likewise, in case of using the adjuster element 1*b* having the inserting member 18 and insertion groove 19 configured as shown in the FIG. 21, the inserting member 18 is engaged with the insertion groove 19 by inserting the inserting member 18 into the insertion groove 19 completely. Therefore, disengagement of the inserting member from the insertion groove can be prevented certainly in those cases.

Thus, according to the assembling method of the present invention, the driving belt B can be assembled easily while adjusting the endplay therein, by using the above-explained adjuster element 1*b* in the array of elements E fastened by the rings 2 and 3 in a circular manner. Specifically, the array of the standard elements 1*a* including the adjuster element(s) 1*b* shown in FIGS. 3, 4 and etc. juxtaposing in a circular manner is fastened by rings 2 and 3 before inserting the inserting member 18 into the insertion groove 19 of the adjuster element 1*b*. Therefore, all of the elements in the element array can be fastened easily by the rigs 2 and 3 under the condition in which the endplay is still remaining in the aligning direction. Thereafter, the endplay can be reduced by inserting the inserting member 18 into the insertion groove 19 of the adjuster element 1*b*. As described, the dimensions of the inserting member 18 are determined taking into consideration the distance of the endplay so that the endplay in the driving belt B can be reduced to substantially zero.

As a result of thus reducing the endplay, the transmission loss resulting from slippages between the element E and the rings 2 and 3 can be reduced so that the power transmission efficiency of the driving belt B can be improved. Thus, the driving belt B can be assembled easily without deteriorating the power transmitting efficiency thereof by using the element E of the present invention including the adjuster element 1b and the basic element 1a. That is, the driving belt B having a preferable transmitting efficiency can be formed easily and efficiently.

Here, the present invention should not be limited to the examples thus far explained. In the above examples, the driving belt B has been explained to be applied to the continuously variable transmission for vehicles. However, the driving belt B and the assembling method thereof according to the present invention may also be applied to another kind of transmission mechanism comprising a belt and pulleys (i.e., to a belt transmission), and to an assembling method thereof.

In addition, in the above-explained examples, the element E having a conventional configuration in which the slits and the saddle face for holding the two rings fastening the element array annularly are formed on both side of the element E in its width direction (i.e., in the width direction of the driving belt B) is used to form the driving belt B. However, the driving belt B according to the present invention should not be limited to the above-explained structure. That is, the present invention may be applied to all kinds of driving belts formed by fastening a plurality of elements by an annular flat belt. For example, the present invention may also be applied to a driving belt using an element in which a recess and a saddle face for holding the ring fastening the element array annularly is formed in a width center of the element.

The invention claimed is:

1. A driving belt, comprising:
a plurality of plate elements juxtaposed in its thickness direction; and
a flat ring, which fastens the elements in a circular manner;
wherein the plurality of elements includes at least one adjuster element, which is configured to adjust an endplay as a total of clearances between adjacent elements in the elements fastened by the ring in a circular manner; and
wherein the adjuster element comprises an insertion groove opening toward the endplay and both lateral ends, and an inserting member which is inserted into the insertion groove from at least one of the lateral ends and configured to protrude partially from the insertion groove thereby adjusting the endplay.

2. The driving belt as claimed in claim 1, wherein:
the insertion groove of the adjuster element is formed on a face of a same side as a face of the adjacent element on which a rocking edge is formed, at a level in the vicinity of a level at which the rocking edge is situated; and
the inserting member comprises an edge portion, which is formed on a face to be opposed to the adjacent element in case the inserting member is inserted into the insertion groove, and which is configured to serve as the rocking edge in case the inserting member is inserted into the insertion groove.

3. The driving belt as claimed in claim 1, wherein:
the adjuster element comprises the rocking edge as that of the adjacent elements;
the insertion groove of the adjuster element is formed on a face opposite to a face of the adjacent element on which a rocking edge is formed, at a level in the vicinity of a level at which the rocking edge is situated; and
the inserting member comprises a flat face, which is formed to be opposed to the adjacent element in case the inserting member is inserted into the insertion groove, and to be in parallel with a face of the adjacent element on which the rocking edge is not formed.

4. The driving belt as claimed in claim 1,
wherein the insertion groove includes
a first insertion groove, which is formed at the level in the vicinity of the level at which the rocking edge of the other element is situated, and
a second insertion groove, which is formed on a head portion of the adjuster element situated in an outer circumferential side of the elements fastened in a circular manner; and
wherein the inserting member includes
a first inserting member, which is inserted into the first insertion groove, and
a second inserting member, which is inserted into the second insertion groove.

5. The driving belt as claimed in claim 1, wherein:
at least one of the inserting member and the insertion groove comprises a disengagement preventing means, which is configured to engage the inserting member with the insertion groove in case the inserting member is inserted into the insertion groove thereby preventing a disengagement of the insertion member from the insertion groove.

6. The driving belt as claimed in claim 2,
wherein the insertion groove includes
a first insertion groove, which is formed at the level in the vicinity of the level at which the rocking edge of the other element is situated, and
a second insertion groove, which is formed on a head portion of the adjuster element situated in an outer circumferential side of the elements fastened in a circular manner; and
wherein the inserting member includes
a first inserting member, which is inserted into the first insertion groove, and
a second inserting member, which is inserted into the second insertion groove.

7. The driving belt as claimed in claim 3,
wherein the insertion groove includes
a first insertion groove, which is formed at the level in the vicinity of the level at which the rocking edge of the other element is situated, and
a second insertion groove, which is formed on a head portion of the adjuster element situated in an outer circumferential side of the elements fastened in a circular manner; and
wherein the inserting member includes
a first inserting member, which is inserted into the first insertion groove, and
a second inserting member, which is inserted into the second insertion groove.

8. The driving belt as claimed in claim 2, wherein:
at least one of the inserting member and the insertion groove comprises a disengagement preventing means, which is configured to engage the inserting member with the insertion groove in case the inserting member is inserted into the insertion groove thereby preventing a disengagement of the insertion member from the insertion groove.

9. The driving belt as claimed in claim 3, wherein:
at least one of the inserting member and the insertion groove comprises a disengagement preventing means, which is configured to engage the inserting member with the insertion groove in case the inserting member is inserted into the insertion groove thereby preventing a disengagement of the insertion member from the insertion groove.

10. The driving belt as claimed in claim 4, wherein:
at least one of the inserting member and the insertion groove comprises a disengagement preventing means, which is configured to engage the inserting member with the insertion groove in case the inserting member is inserted into the insertion groove thereby preventing a disengagement of the insertion member from the insertion groove.

11. The driving belt as claimed in claim 6, wherein:
at least one of the inserting member and the insertion groove comprises a disengagement preventing means, which is configured to engage the inserting member with the insertion groove in case the inserting member is inserted into the insertion groove thereby preventing a disengagement of the insertion member from the insertion groove.

12. The driving belt as claimed in claim 7, wherein:
at least one of the inserting member and the insertion groove comprises a disengagement preventing means, which is configured to engage the inserting member with the insertion groove in case the inserting member is inserted into the insertion groove thereby preventing a disengagement of the insertion member from the insertion groove.

13. An assembling method of a driving belt, comprising:
an aligning step of juxtaposing a plurality of plate elements in its thickness direction; and
an assembling step of fastening an array of the elements juxtaposed at the aligning step in a circular manner;
wherein at least one adjuster element is aligned in an array of the elements at the aligning step before inserting the inserting member into the insertion groove,
wherein the adjuster element is configured to adjust an endplay as a total of clearances between adjacent elements in the elements fastened in a circular manner, and
wherein the adjuster element comprises an insertion groove opening toward the endplay, and an inserting member which is inserted into the insertion groove and configured to protrude partially from the insertion groove thereby adjusting the endplay; and
the assembling method further comprising
an endplay adjusting step of reducing an endplay after the assembling step, by inserting the inserting member into the insertion groove.

* * * * *